(12) United States Patent
Otsuki

(10) Patent No.: US 6,336,703 B1
(45) Date of Patent: *Jan. 8, 2002

(54) PRINTER, PRINTING METHOD, AND RECORDING MEDIUM

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/588,712

(22) Filed: Jun. 7, 2000

(30) Foreign Application Priority Data

Jun. 8, 1999 (JP) .............................. 11-160540

(51) Int. Cl.$^7$ .............................. B41J 2/145
(52) U.S. Cl. .......................... 347/41; 347/40
(58) Field of Search ................ 347/41, 12, 9, 347/40; 358/296, 298; 395/109

(56) References Cited

U.S. PATENT DOCUMENTS 6,155,668 A * 12/2000 Otsuki et al. ................. 347/41

FOREIGN PATENT DOCUMENTS

| EP | 0 665 114 | 8/1995 |
| EP | 0 679 518 | 11/1995 |
| EP | 0 931 669 | 7/1999 |
| JP | 8-130433 | 5/1996 |
| JP | 2000-118042 | 4/2000 |

* cited by examiner

*Primary Examiner*—N. Le
*Assistant Examiner*—Lamson D. Nguyen
(74) *Attorney, Agent, or Firm*—Oblon, Spivak, McClelland, Maier & Neustadt, P.C.

(57) ABSTRACT

An inkjet printer uses interlaced printing to form raster lines at intervals in the sub-scanning direction. The paper is transported by feed rollers on the upstream side relative to the sub-scanning, and ejection rollers on the downstream side. After the trailing edge of the paper clears the feed rollers, it is printed while being moved in the sub-scan direction by just the ejection rollers. The feed used for the interlaced printing is set at an amount that produces an area between a high-precision area of raster lines formed using the feed rollers to effect sub-scanning, and a low-precision area in which the raster lines are formed using just the ejection rollers to effect sub-scanning. The area thus includes raster lines from both of the other areas. Performing sub-scanning at that feed amount makes the difference in quality between the high-precision area and the low-precision area less noticeable, making it possible to increase the size of the printable area.

14 Claims, 17 Drawing Sheets

PRINTER, PRINTING METHOD, AND RECORDING MEDIUM

FIELD OF THE INVENTION

The present invention relates to a technology for expanding the area in which an image is printed by a printer that uses interlaced printing to print images by forming dots while effecting sub-scanning.

DESCRIPTION OF THE RELATED ART

In order to increase the printing speed of printers that use a dot printing head to form raster lines while performing sub-scanning at right-angles to the raster lines, most such printers are equipped with an array of nozzles arrayed in the sub-scanning direction. This is particularly true in the case of inkjet printers. In recent years, to achieve higher speeds, there has been a trend toward increasing the number of nozzles in the sub-scanning direction, increasing the size of nozzle arrays.

The interlaced printing system disclosed by U.S. Pat. No. 4,198,642 is one technology that is used to improve the quality of printing by such printers. FIG. 18 illustrates an example of interlaced printing. In this example, the number N of dot-formation nozzles is three. The pitch k of the raster lines laid down by the nozzles, that is, the spacing between nozzle raster line centers, is two raster lines. In the sub-scanning direction, the paper is fed in length L increments of three raster lines. In FIG. 18, the two-digit number in each circle denote the position at which each dot is printed. With further respect to the two-digit numbers, the digit on the left is the number of the nozzle used to print the dot, while the digit on the right indicates the number of the main scanning unit pass during which the dot is printed.

In the example of FIG. 18, during the first pass, dot raster lines are formed by the second and third nozzles, and the first nozzle is not used. The paper is then advanced by an amount corresponding to three raster lines, and the second main scanning unit is performed, during which a raster line is printed by each of the three nozzles. The image is printed by repeating this process of raster line formation and paper advance. The first nozzle is not used to form a raster line during the first pass to enable it to be used to form adjoining raster lines therebelow, during the second and subsequent passes.

Interlaced printing enables the effect of variations in nozzle pitch, sub-scan feed precision, ink emission properties and the like to be diffused, thereby enabling the image quality to be improved by reducing the deviation in dot position caused by such factors. Interlaced printing can be implemented using various paper feed amounts according to the number of scanning passes to complete dot formation on each raster line, the number of nozzles, nozzle pitch and so forth.

However, a problem with interlaced printing is that at the lower end of the paper there is an area in which printing cannot be accomplished. This is shown by FIG. 19, which illustrates an example of interlaced printing using a print head having seven nozzles disposed at a pitch corresponding to four raster lines. The paper is fed in the sub-scan direction in set increments of seven raster lines each. The circles represent the position of the head in the sub-scanning direction, during each main scanning unit pass. The numbers in the circles are the nozzle numbers.

FIG. 19 shows seven main scanning unit passes, from L-6 to L, at the lower end of the page being printed. In this explanation, nozzle number 7 in main scanning unit pass L is taken to be at the lower limit at which a nozzle can be positioned during printing. As can be seen, interlaced printing gives rise to a blank raster line, a raster line on which dots are not printed, shown here as the raster line adjoining the lower end of the area A. This means that printing cannot be effected in the 18-raster line area that extends from the area A down to the lower limit.

The greater the number of nozzles there are in the array, the larger the unprintable area becomes. The growing size of nozzle arrays in recent years has made it impossible to ignore this unprintable area. A large such area reduces the value of a printer. Moreover, with the demand being for higher print quality and faster speeds, reducing the size of the unprintable area at the expense of print quality is unacceptable.

SUMMARY OF THE INVENTION

This invention was accomplished to overcome the foregoing problems of the related art and has as its object to provide a technology which, during interlaced printing, ensures an adequate printable area without any excessive loss of print quality.

The present invention provides a printer having the following configuration.

In accordance with the present invention, there is provided a printer that prints an image on a print medium by using a print head to form raster lines in a primary direction and scan in a sub-scan direction at right-angles to the raster lines. The printer comprising: a print head having a plurality of dot formation elements disposed in a sub-scanning direction at a prescribed spacing that is not less than two dots, and dot formation elements for forming dots of a different type, disposed separately in the sub-scanning direction; a first transport unit that effects sub-scanning by transporting at a first precision at least one selected from the print head and the print medium; a second transport unit that, when sub-scanning cannot be effected by the first transport unit, effects sub-scanning by transporting at a second precision that is lower than the first precision at least one selected from the print head and the print medium; a data supply unit that assigns to the dot formation elements raster data for forming raster lines for printing the image, supplies the data to the print head, and also performs masking of dot formation elements where there are no raster lines to be formed; a raster line formation unit that drives the print head to form each raster line in accordance with the data supplied by the data supply unit; and a sub-scanning unit that performs sub-scanning by a preset feed amount when there arises a condition in which, in sequential usage of the first and second transport unit, an area is formed in which raster lines formed during sub-scanning effected by the second transport unit are included between raster lines formed during sub-scanning effected by the first transport unit. This is intended for printers with print heads having formation elements for different types of dots arrayed in the main scanning unit direction, such as a multicolor printer having a print head in which the elements for forming the dots of each color are arrayed in the main scanning unit direction.

Printers usually have a unit for effecting high-precision sub-scanning during printing, and a unit of ejecting the paper after the printing is finished. In the case of the printer of this invention, the first transport unit is used as the former and the second transport unit as the latter. Moreover, when sub-scanning by the first transport unit is no longer possible, printing continues using the second transport unit to effect sub-scanning. As explained above, when printing by the interlaced method, although sub-scanning may be effected down to the lower limit with respect to nozzle position, below that is an unprintable area. In this respect, the second transport unit of the printer of this invention enables the lower limit of sub-scanning to be extended, thereby increasing the area that can be printed using interlaced printing.

In addition, sub-scanning by the printer of this invention produces an area that includes raster lines formed by the second transport unit between raster lines formed by the first transport unit. The first and second transport unit are used sequentially, so printed images are comprised of an area printed by the first transport unit (hereinafter also referred to as "high-precision area"), an area comprised of raster lines formed by both the first and second transport unit (hereinafter also referred to as "mixed-raster line area"), and an area printed by the second transport unit (hereinafter also referred to as "low-precision area"), in that order, or the reverse thereof, in the direction of the sub-scanning.

Since the precision of the second transport unit is lower than that of the first transport unit, the image quality of the resultant low-precision area is not as good as that of the high-precision area. If a high-precision area and a low-precision area are positioned adjacently with no mixed-raster line area between them, the drop in image quality is more pronounced, and deviations in the dot formation positions can give rise to pseudo-outlines at boundaries. The printer of this invention makes the transition between high- and low-precision areas less noticeable by providing a mixed-raster line area between them, also enabling the suppression of pseudo-outlines at boundaries. Thus, the printer according to this invention enables the printable area to be increased without decreasing the quality of the printed image.

Although the foregoing explanation was made with reference to an arrangement in which the second transport unit is used to eject the paper, the invention is not limited thereto. Instead, the invention can be applied to various types of printer having two transport unit that differ in terms of transport precision and area, regardless of whether or not such unit are used to eject the paper.

The printer of the invention is capable of various feed settings that satisfy the above conditions. For example, the sub-scan feed amount effected by the second transport unit may be the same as that effected mainly for sub-scanning by the first transport unit.

The fact that interlaced printing gives rise to blank raster lines, as described with reference to FIG. 19, unit that there is a limit to the area that can be printed at high precision. However, as is clear from the example of FIG. 19, in the unprintable area, high-precision printing of raster lines is intermittently possible during main scanning unit passes L–2 to L. Blank raster lines, such as the ones shown in the drawing, can be formed one after the other by continue to effect sub-scanning using the second transport unit, making it possible to produce an area of raster lines formed by both the first and second transport unit.

In the example of FIG. 19 in which the nozzle pitch and number of nozzles are specified, the same type of printing can be effected with interlaced printing. That is, regardless of whether sub-scanning is effected by the first or second transport unit, a mixed-raster line area can be formed using a prescribed sub-scan feed amount common to both. In accordance with the inventive printer having the above configuration, it is not necessary to adjust the control of the sub-scanning according to the transport unit used, which makes it very easy to control to achieve printing that includes a mixed-raster line area.

In the case of FIG. 19, the sub-scan feed is in set increments each corresponding to seven raster lines. In the case of the present invention, the feed amount does not have to be fixed. Instead, depending on the nozzle pitch and the number of nozzles, interlaced printing may be performed using a set cycle of a plurality of different feed amounts, with each feed amount being applied without modification.

It is also not necessary to use the same feed amounts for high-precision, mixed-raster line and low-precision areas. Particularly in the case of low-precision areas, it is desirable to set a compensatory feed amount to make up for the lower precision.

For example, the sub-scan feed amount effected by the second transport unit could be set to be smaller than the average feed amount effected in the sub-scan direction by the first transport unit.

Decreasing the size of the sub-scan feed amount increases the precision of the sub-scanning. As such, in the case of a low-precision area, it is possible to compensate for the lower sub-scanning precision by using a sub-scan feed amount that is smaller than that used in a high-precision area. Even in a low-precision area, this makes it possible to maintain an image quality that is on a par with that of a high-precision area. "Average feed amount" refers to the set feed amount by which sub-scanning is effected in a high-precision area; in cases in which sub-scanning is effected using a cycle of a plurality of different feed amounts, the average feed amount unit the average of the plurality of feed amounts. The average feed amount may also be used to evaluate the sub-scan feed effected by the second transport unit.

As another setting, the sub-scan feed by the second transport unit may be set at an amount that enables the formation of raster lines by a number of elements that is larger than the number of elements required to form raster lines during sub-scanning by the first transport unit.

With such a setting, overlap printing is used in low-precision areas. In overlap printing, each raster line is printed using a plurality of formation elements. Printing the dots of odd-numbered pixels during a first pass and using different elements to print the dots of even-numbered pixels during a second pass is an example of such a method. Like interlaced printing, overlap printing can improve print image quality by diffusing the effect of the positional deviation of dots in the image. In the case of a low-precision area, the above setting makes it possible to compensate for the lower sub-scanning precision by using overlap printing implemented using a larger number of elements than the number of elements used for a high-precision area. This unit that even in a low-precision area, it is possible to maintain an image quality that is on a par with that of a high-precision area.

The printer of the present invention can also be configured to perform printing using just a feed amount satisfying the conditions described in the foregoing. For this, it is desirable that the printer also includes a second sub-scanning unit that uses just the first transport unit to effect sub-scanning in preset feed amounts, and a selection unit that, based on specific conditions, selectively uses the sub-scanning unit and second sub-scanning unit.

In a first printing mode, the printer thus configured has a first printing mode in which the printing includes the printing of high-precision, mixed-raster line and low-precision areas, and a second printing mode in which only the high-precision area is printed. The selection unit enables the appropriate mode to be used. This enables the required printing to be achieved and makes the printer more convenient.

Various selection conditions can be set in the printer. For example, a selection command can be used to select between the printing mode using the above-described sub-scanning unit and the printing mode using the second sub-scanning unit, with the choice depending on the user's requirements.

Although the first printing mode includes the printing of low-precision areas, it has the advantage of a larger printable area than that of the second printing mode. This feature can be used as a basis for automatically selecting the printing mode. For example, the system can be configured to select the sub-scanning unit when the image to be printed is above a certain size.

This makes the printer much more convenient to use. The two selection methods may be applied in combination so that when the image is larger than a certain size, the user can specify the appropriate mode. The basis of the mode selection is not limited to this, and may include other criteria such as whether text or graphic data is to be printed, the type and thickness of the paper, the overlapping method, resolution and other such printing conditions.

When printing is performed using the second sub-scanning unit, sub-scanning in at least an area located at one end in the sub-scanning direction can also be performed using a smaller average feed amount setting than the average feed amount used for sub-scanning in a central area.

With this configuration, the size of the sub-scan feed amount is reduced in the vicinity of the lower end of the high-precision area. By thus enabling raster lines to be formed more densely in the sub-scanning direction, the area that cannot be printed during interlaced printing can be decreased. In effect, the high-precision printing area is expanded.

This invention can be applied to various types of dot printer. Particularly in the case of an inkjet printer, it is desirable to situate the first transport unit upstream of the second transport unit in terms of the direction of sub-scanning.

Owing to variations in the ink emission characteristics, positional deviation of dots is a common occurrence in the case of inkjet printers. To prevent bleeding or color mixing between adjacent dots, it is preferable to leave some time between the formation of adjacent raster lines. In view of the fact that interlaced printing is particularly effective when used by inkjet printers, this makes the present invention highly applicable.

A page printed by an inkjet printer has to be protected until the ink is sufficiently dry. However, it is difficult to protect the printed surface and at the same time perform high-precision sub-scanning. Therefore, the printer of this invention can be configured with the first transport unit on the upstream side of the sub-scanning and the second transport unit on the downstream side.

The first transport unit can be constituted with friction rollers on the upstream side to transport the printing paper, while the second transport unit can be constituted to transport the paper on the downstream side with friction rollers having a lower frictional force than the rollers on the upstream side.

The invention also comprises a method of printing images on a print medium.

The present invention also comprises a recording medium recorded a computer program used to drive a printer to print images.

The printer described in the foregoing can be realized by the execution of the programs. The recording medium may be a floppy disk, CD-ROM, opto-magnetic disk, IC card, ROM cartridge, punched cards, printed material on which bar codes or other such symbols are printed, internal computer storage unit such as RAM or ROM memory, as well as external storage unit and other such computer-readable media. A configuration can also be used in which the computer programs for effecting the various functions are supplied to the computer via a telecommunication channel.

Each of the aspects of the invention described above can be applied to printers in which raster lines are formed while the print head is moved reciprocally in the main scanning unit direction, relative to the print medium, and to printers that are provided with multiple printing elements arrayed in the direction of the raster lines that enable the raster lines to be formed without main scanning unit.

Figure 1:
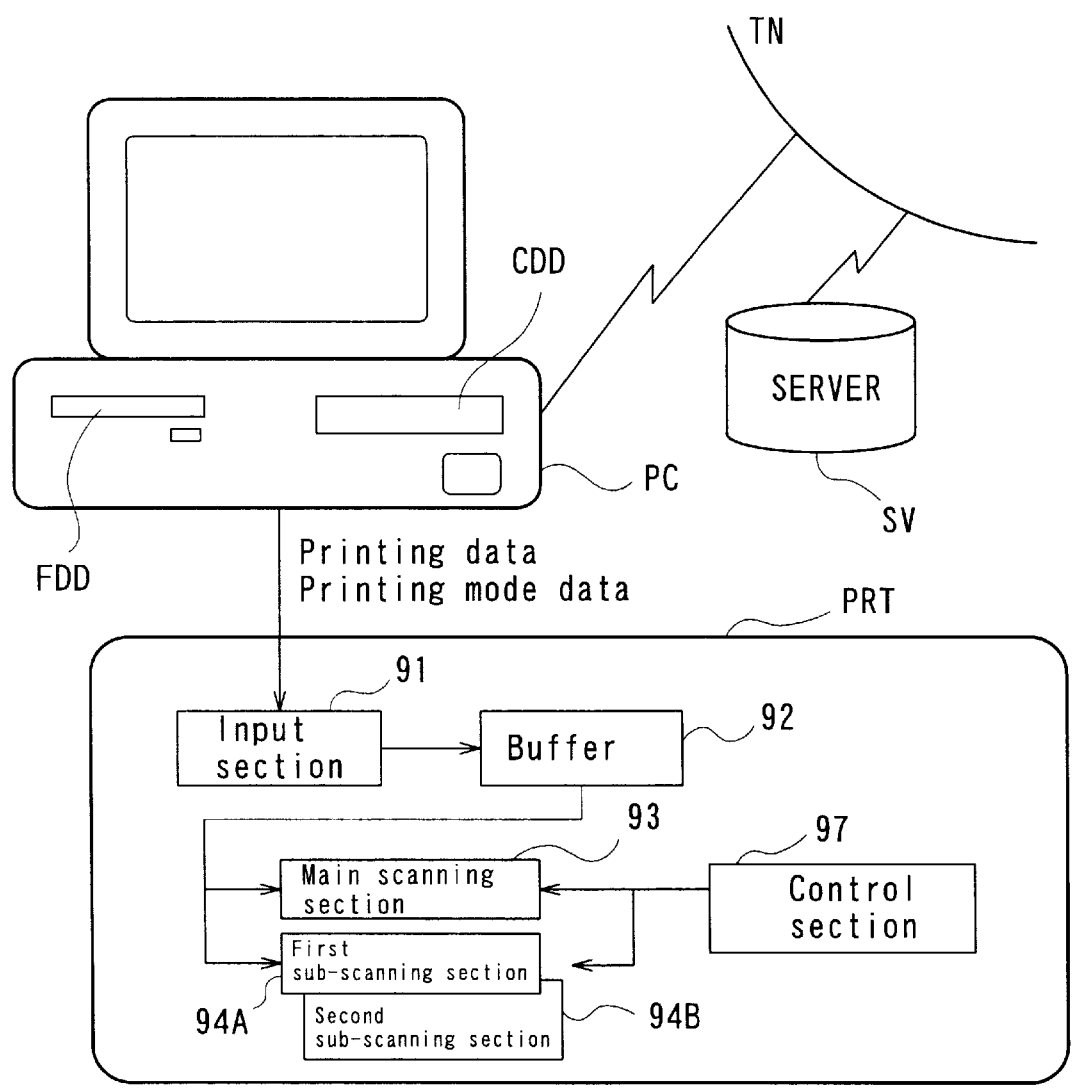
FIG. 1 is a diagram showing the configuration of a printing system using a printer PRT that is a first embodiment of this invention.

DESCRIPTION OF THE PREFERRED EMBODIMENTS (1) System configuration:

FIG. 1 is a diagram showing the configuration of a printing system using a printer PRT that is a first embodiment of this invention. The printer PRT is connected to a computer PC and executes printing based on printing data received from the computer PC. The printer PRT is operated by printer driver software executed by the computer PC. The computer PC is connected to an external network TN through which it can be connected to a server SV from which it can download data and programs for operating the printer PRT. A floppy disk drive FDD and/or CD-ROM drive CDD can also be used to load the necessary programs and data from a floppy disk or CD-ROM.

As shown in FIG. 1, printer PRT includes an input section 91, a buffer 92, a main scanning section 93, a first sub-scanning section 94A, a second sub-scanning section 94B and a control section 97.

Printing data and printing mode data from the computer PC is received by the input section 91 and placed in the buffer 92. The printing data comprises halftone data designating the on/off state of the dots of each color for each of the pixels used to print an image. The main scanning section 93 effects reciprocating motion of the print head equipped with multiple inkjet nozzles, to thereby form main scanning raster lines composed of dots. During this main scanning pass, the control section 97 supplies the print head with data from the buffer 92, and masks nozzles that are not to be used.

Each time a main scan pass is completed, the paper is moved in the sub-scanning direction by the first and second sub-scanning sections 94A and 94B. The printer PRT can print in two modes. The first sub-scanning section 94A effects the sub-scanning in feed increments according to a first printing mode, and the second sub-scanning section 94B effects sub-scanning in feed increments according to a second printing mode. One of the sub-scanning section is selected by the control section 97, based on the printing mode data concerned.

Figure 2:
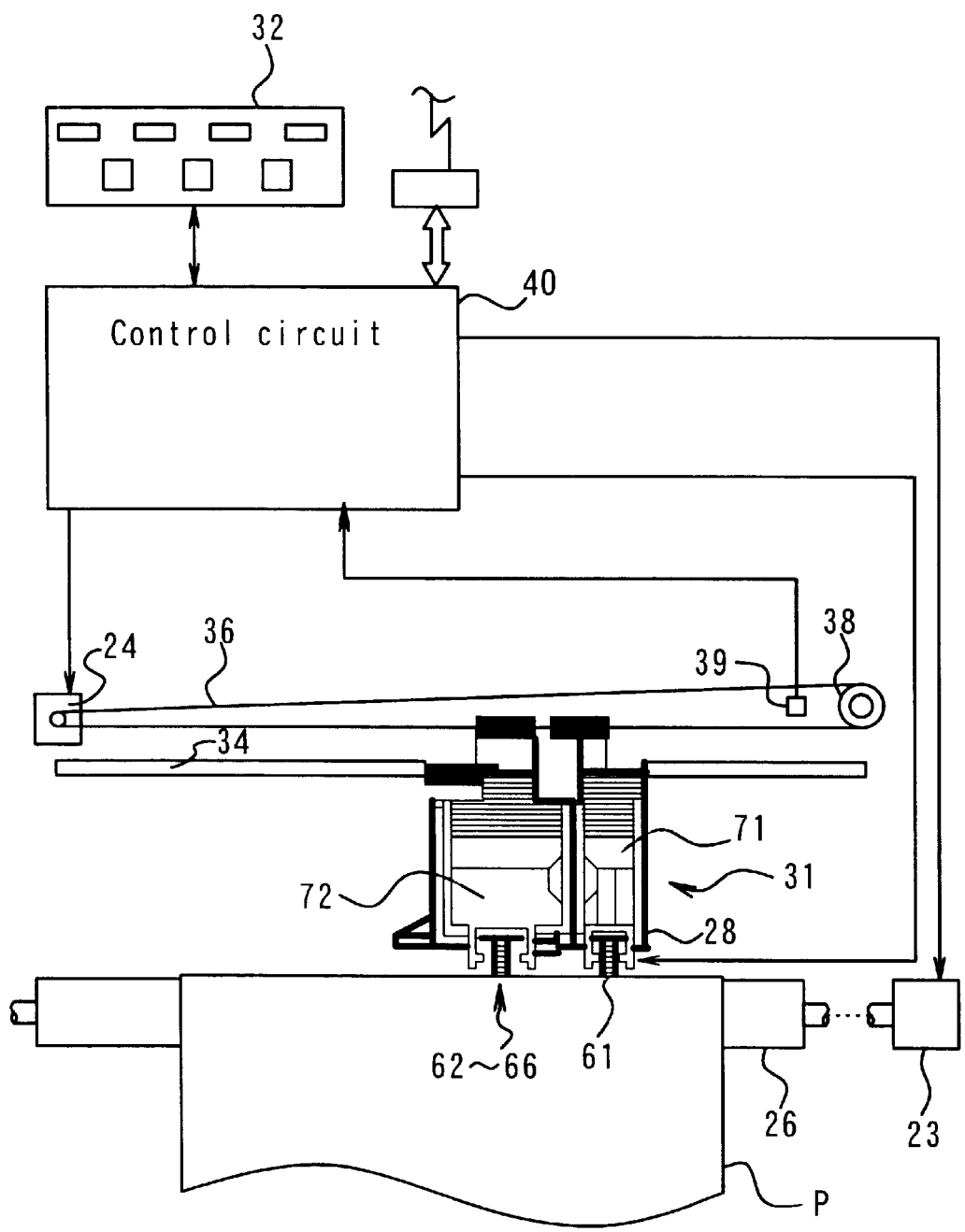
FIG. 2 is a diagram that schematically illustrates the printer PRT.

The configuration of the printer PRT will now be explained with reference to FIG. 2. As shown, the printer 22 comprises a mechanism including a feed motor 23 to feed paper P, a mechanism including a carriage motor 24 to effect reciprocal motion of a carriage 31 in the axial direction of platen 26, a mechanism for driving a print head 28 mounted on the carriage 31 and for controlling ink emission and dot formation, and a control circuit 40 for handling the communication of signals between the control panel 32 and the feed motor 23, carriage motor 24 and print head 28.

Figure 3:
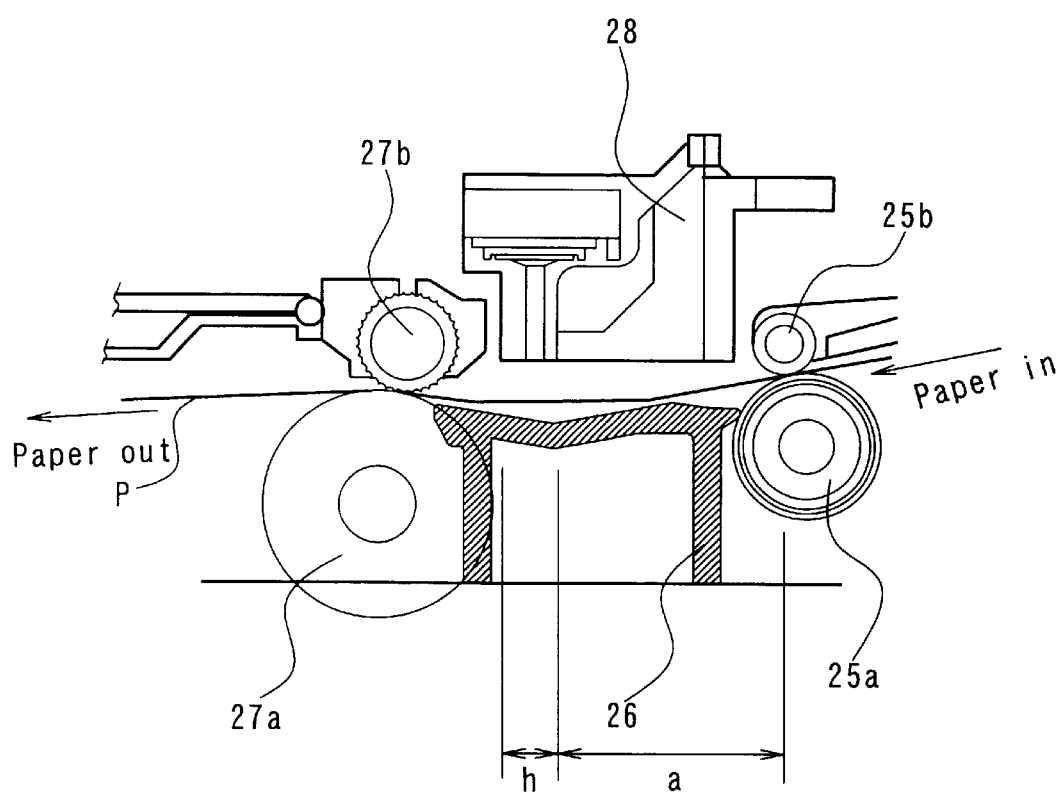
FIG. 3 is a diagram showing a sectional side view of the mechanism for transporting paper P.

The paper transport mechanism will now be explained. FIG. 3 is a sectional side view of this mechanism used to transport the paper P. The mechanism comprises a feed roller 25a and an idle roller 25b at the paper supply end, and an eject roller 27a and a star-wheel roller 27b at the paper outlet end. These rollers are driven by the feed motor 23 through a gear train. As shown, at the supply end the paper P is gripped between the rollers 25a and 25b, which are rotated to move the paper forward until the leading edge of the paper is gripped between the eject roller 27a and star-wheel roller 27b and ejected by the rotation of those rollers. The print head 28 prints images on the part of the paper P on the platen 26.

The high gripping pressure exerted on the paper P by the rollers 25a and 25b enables the paper to be transported with good precision. In contrast, on the outlet side the gripping pressure of the rollers 27a and 27b is low in order to protect the printed surface. Therefore, when the trailing edge of the paper P clears the rollers 25a and 25b and the paper is being transported just by the rollers 27a and 27b, there is a slight decrease in the paper transport precision, compared to that effected by the rollers 25a and 25b. Below, paper movement co effected by the rollers 25a and 25b at the paper supply end will be referred to as high-precision feed, and paper movement effected by only the rollers 27a and 27b on the output side will be referred to as low-precision feed.

The mechanism for effecting reciprocating motion of the carriage 31 parallel to the axis of the platen 26 includes a slide-shaft 34 disposed parallel to the axis of the platen 26, on which the carriage 31 is slidably supported, a pulley 38 that tensions an endless drive belt 36 running between the pulley 38 and the carriage motor 24, and a position sensor 39 for detecting the base position of the carriage 31.

The carriage 31 can be equipped with a black-ink (K) cartridge 71 and a colored-ink cartridge 72 containing ink of the five colors cyan (C), light cyan (LC), magenta (M), light magenta (LM) and yellow (Y). The print head 28 beneath the carriage 31 has six inkjet heads 61 to 66. When the carriage 31 is equipped with the cartridges 71 and 72, the heads 61 to 66 are supplied with the inks from the cartridges.

Figure 4:
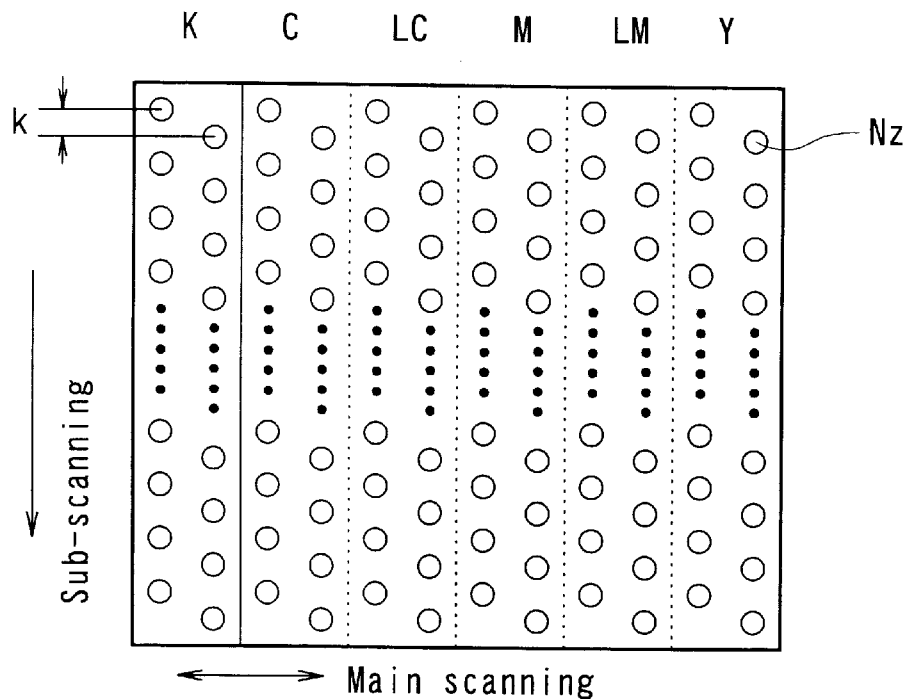
FIG. 4 is a diagram showing the arrangement of nozzles Nz in heads 61 to 66.

FIG. 4 shows the arrangement of the nozzles Nz in the heads 61 to 66. As shown, the nozzles are grouped into six arrays, one for each color. The nozzles are arranged in a zigzag formation at a set pitch k. In the sub-scanning direction, the nozzles of each array have the same positions.

Figure 5:
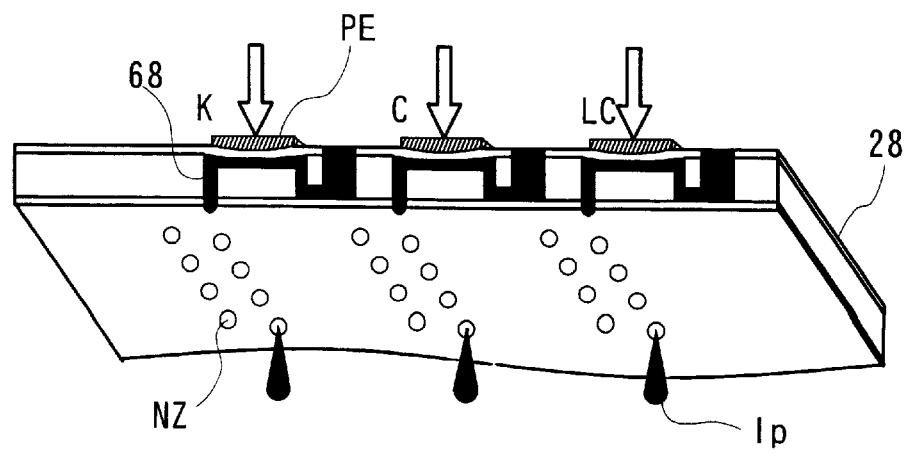
FIG. 5 is a diagram illustrating the dot formation principle of head 28.

FIG. 5 illustrates the dot formation principle of the print head 28. For convenience, the drawing shows just the portion from which black ink (C), cyan (C) and light cyan (LC) are emitted. When the ink cartridges 71 and 72 are set into position on the carriage 31, the inks of each color are supplied to the corresponding heads 61 to 66 via the ink channels 68.

In the heads 61 to 66, each nozzle is provided with a piezoelectric element PE. Applying an electrical charge to a piezoelectric element produces a distortion of the crystalline structure that can be used for high-speed conversion of electrical to mechanical energy. In this embodiment, when a voltage is applied across the electrodes of the piezoelectric element PE, the piezoelectric element PE expands in the direction indicated by the arrows in FIG. 5 for the duration of the said voltage application. This deforms a wall of the ink channel 68, reducing the volume of the ink channel 68 by an amount corresponding to the expansion of the piezoelectric element PE, thereby expelling a corresponding amount of ink in the form of an ink particle Ip that is emitted at a high velocity from the nozzle Nz. Printing is effected by these ink particles Ip soaking into the paper P on the platen 26.

Figure 6:
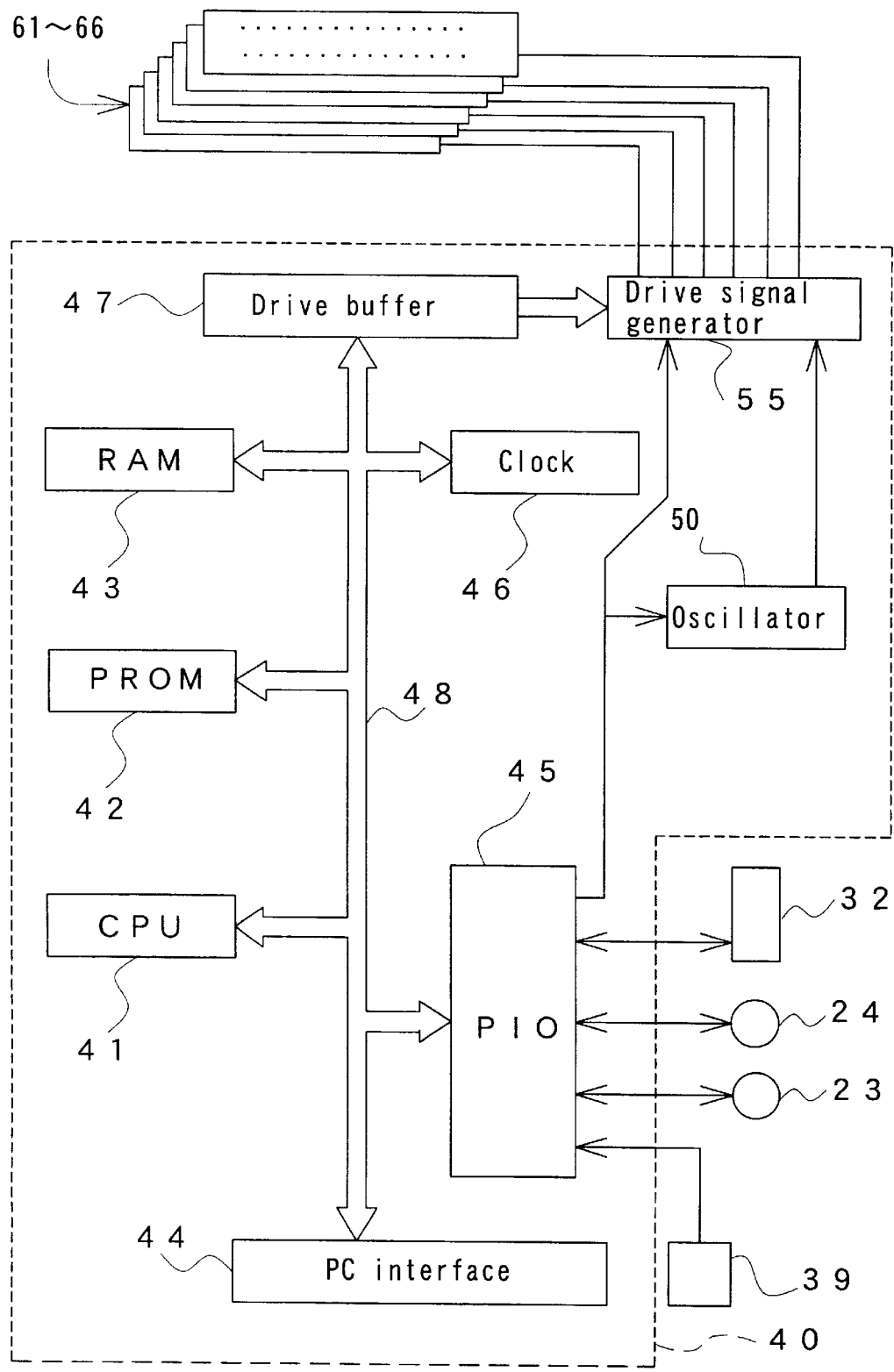
FIG. 6 is a diagram showing the internal configuration of the control circuit 40.

The internal configuration of the control circuit 40 will now be explained, with reference to FIG. 6. As shown in FIG. 6, in addition to a CPU 41, PROM 42 and RAM 43, the control circuit 40 has a PC interface 44 that is used for data communication with the computer PC. A peripheral input/output section (PIO) 45 allows the communication of signals among the feed motor 23, the carriage motor 24 and the control panel 32 and the like. Control circuit operations are synchronized by a clock 46. A drive buffer 47 outputs dot on/off signals for each of the nozzles in the heads 61 to 66 to a drive signal generator 55.

Based on a base drive signal received periodically from an oscillator 50, the drive signal generator 55 generates a drive waveform that is output to the nozzle arrays of heads 61 to 66. The drive wave form thus generated is output to nozzles that are to be used to form dots according to data received from the drive buffer 47. In line with the state of progress of the printing, the buffer 47 supplies the drive signal generator 55 with raster data for each nozzle. When there are no nozzles for raster lines that should be formed near where printing is started or terminated, mask data is supplied signifying non-formation of dots. All this is controlled by the CPU 41.

Via the PIO 45, the CPU 41 controls the operation of the feed motor 23 to effect sub-scanning. The feed amounts used in the sub-scanning are stored before hand in the PROM 42. Since the printer PRT can print in two modes that use different sub-scan feed amounts, the PROM 42 contains the feed amounts for each printing mode. When the printing mode is designated, the CPU 41 reads out the corresponding feed amount data from the PROM 42 to execute sub-scanning.

Although this embodiment has been described with reference to a printer PRT equipped with print heads that use piezoelectric elements PE to emit ink, a printer may be used that emits ink by another mechanism. For example, the ink channel can be provided with a heater that when switched on generates a bubble in the ink channel to emit the ink.

Figure 7:
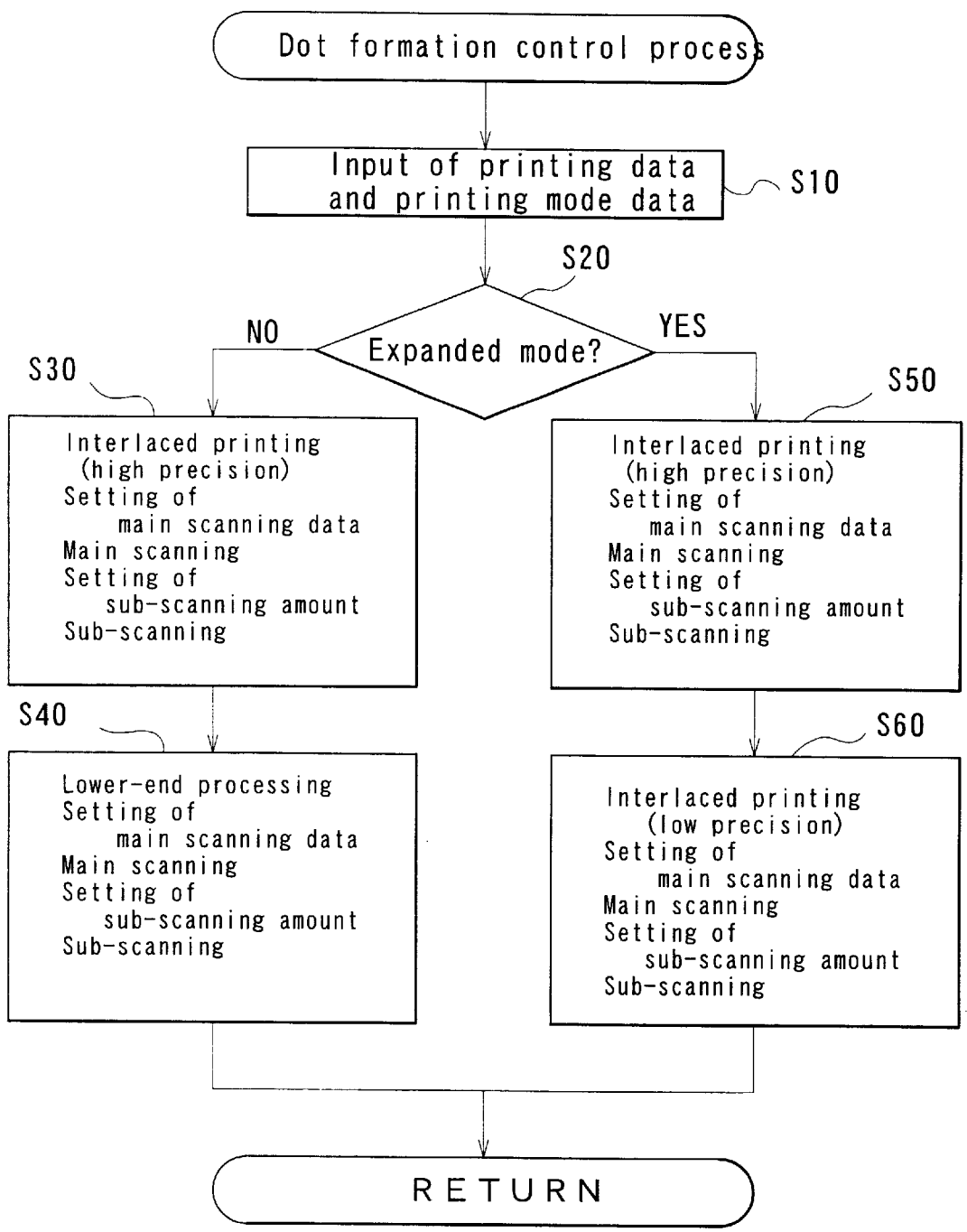
FIG. 7 is a flow chart of the dot formation control process.

(2) Control of dot formation:

Printing by the printer PRT of this embodiment will now be explained. FIG. 7 is a flow chart of the dot formation control process, which is implemented under the control of the CPU 41.

When the dot formation control routine is started, the CPU 41 inputs the printing data and printing mode (step S10). Printing data is generated by the printer driver through color correction and halftone processing of the raw image data, and represents the on/off state of each color dot on a pixel by pixel basis. In step S10, all of the data relating to the printing of the images can be input, or the data can be input sequentially, in parallel with the dot formation process described below.

Figure 8:
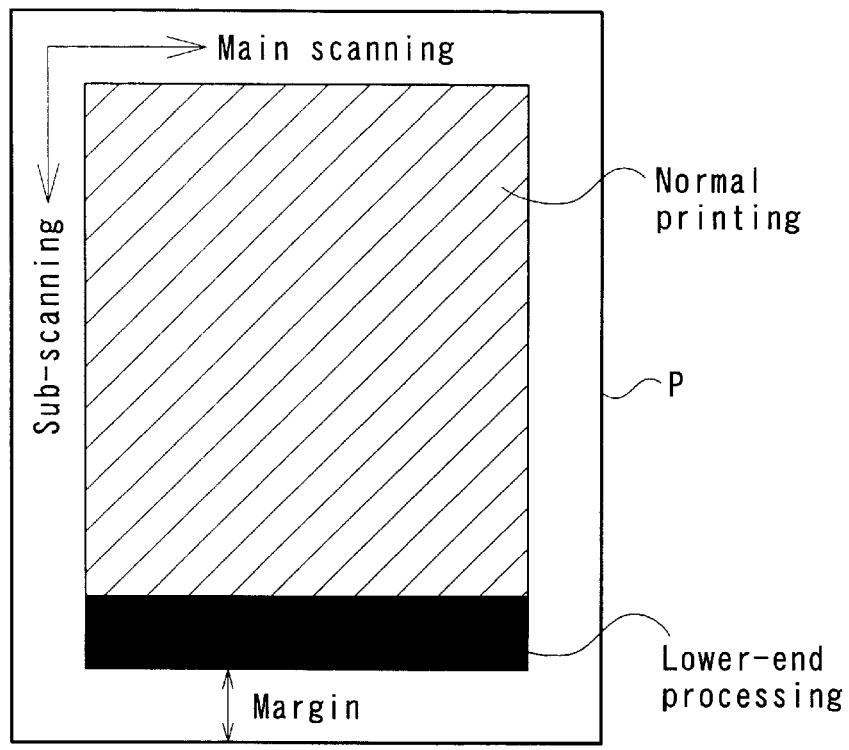
FIG. 8 is a diagram for explaining the printing of an image in standard mode.
Figure 9:
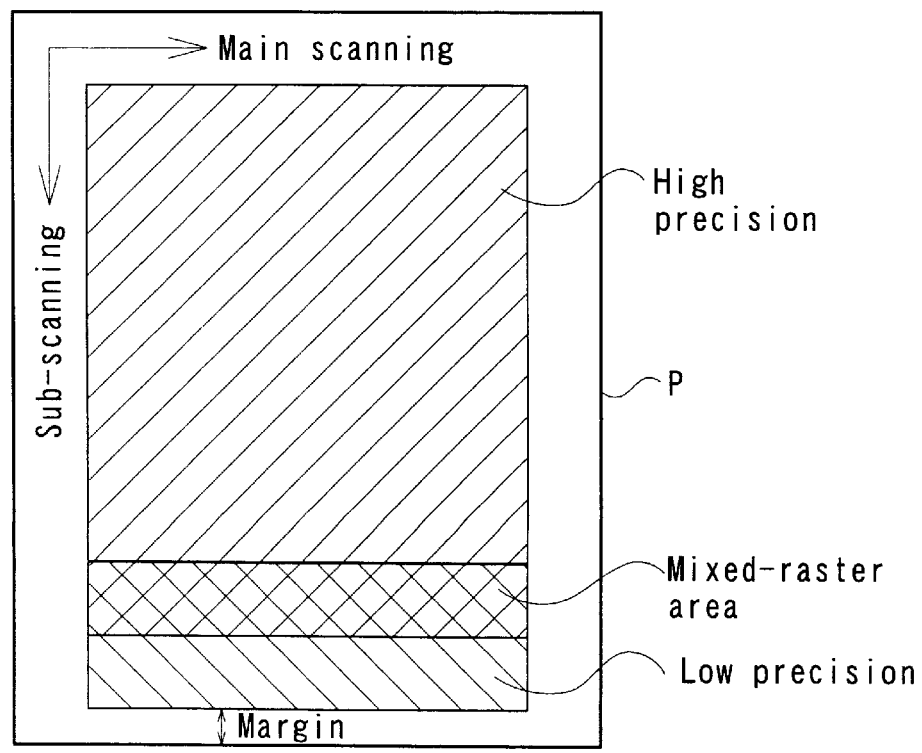
FIG. 9 is a diagram for explaining the printing of an image in expanded mode.

The printer PRT can print in one of a standard mode and an expanded mode. FIG. 8 illustrates standard-mode printing of an image. In standard mode, the image is printed on the page in an ordinary printing area and a lower-end processing area, with the two areas being disposed adjacently in the direction of sub-scanning. Both areas are printed using high-precision sub-scan feed. FIG. 9 illustrates expanded-mode printing. In expanded mode, the image is comprised of three areas, a high-precision area, a mixed-raster line area and a low-precision area, arranged adjacently, in that order, in the direction of sub-scanning. The high-precision area is formed using a high-precision sub-scan feed, the low-precision area is formed using a low-precision sub-scan feed, and the mixed-raster line area is formed using a mixture of high- and low-precision feeds. The area that can be printed in the expanded mode is larger than the area that can be printed in the standard mode. In other words, expanded-mode printing results in a bottom margin that is smaller than that left by standard-mode printing.

The printing mode is selected by the user. In step S20 the CPU 41 determines whether or not the input specifies expanded printing mode, and proceeds accordingly to the next step.

Figure 10:
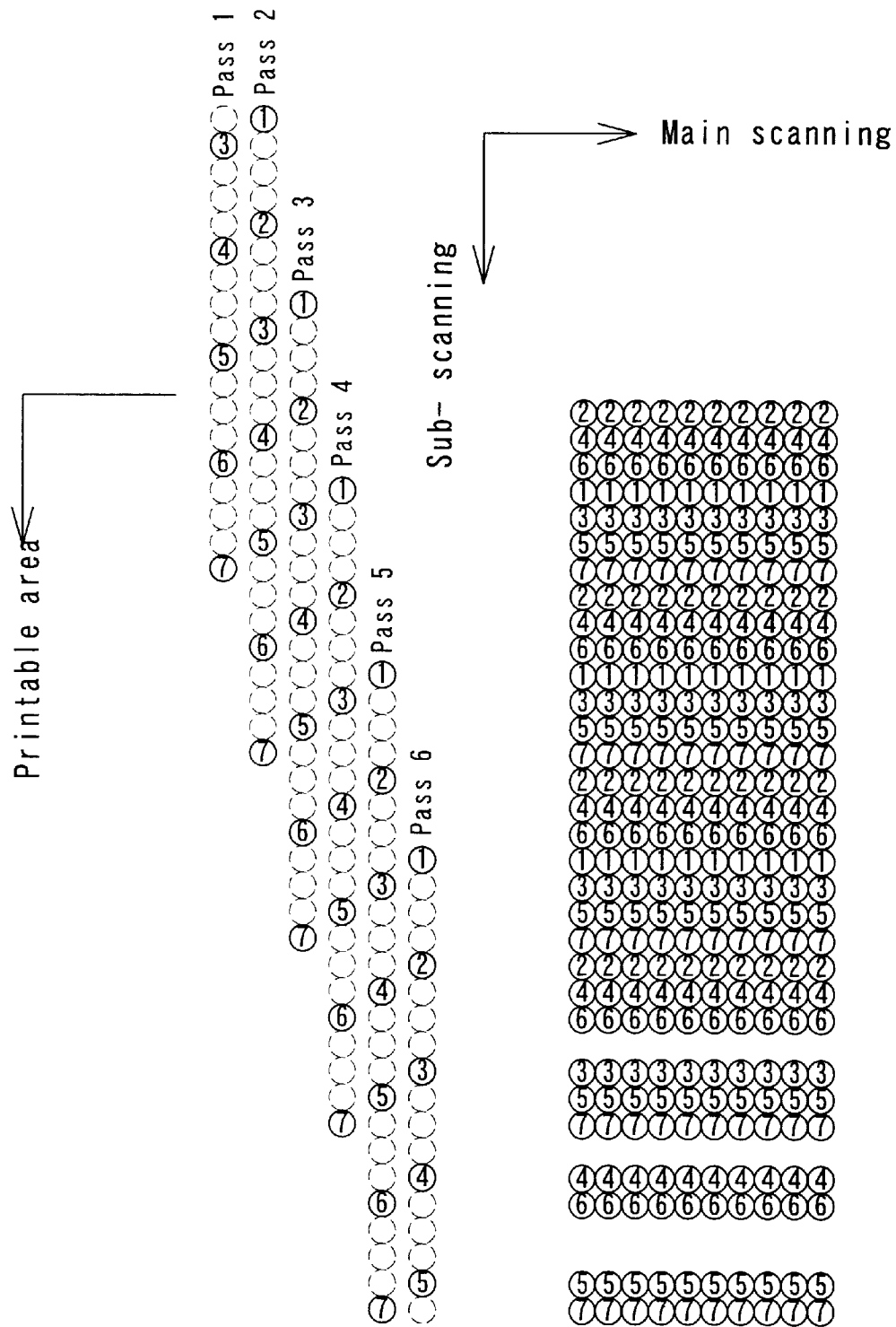
FIG. 10 is a diagram for explaining standard mode printing in the normal printing area.

If it is determined that expanded mode has not been selected, standard mode printing is performed. This entails interlaced printing of the normal printing area shown in FIG. 8 (step S30). FIG. 10 is a diagram for explaining standard mode printing in the normal printing area. For simplicity, the drawing depicts a head with seven nozzles set at a four-dot pitch. The left side shows the sub-scanning position of the head during the first six main scanning unit passes. The number in the circles is the nozzle number. The right side shows the dots printed by each nozzle. Thus, the image can be printed in the printable area by raster lines formed with each main scanning pass while advancing the seven raster lines by a fixed amount in the sub-scan direction.

The interlaced printing is effected by continually repeating a process comprising setting a main scanning pass data, executing the main scanning pass, setting the sub-scanning amount, and executing sub-scanning. The main scanning pass data represents dot formation on the raster lines to be printed by the nozzles during each main scanning pass. As can be seen from the example shown in FIG. 10, the raster line to be printed by each nozzle is determined according to the sub-scanning history from the start of the printing. Main scanning comprises moving the head and forming dots at each pixel based on the data thus set. In the example of FIG. 10, for the sub-scanning, a feed amount of seven dots is set. The sub-scan feed amount is determined beforehand based on the nozzle pitch, the number of nozzles, and the number of main scans required to complete dot formation on each raster line, and is stored in memory. In step S30, the sub-scan feed amount thus set is used to perform high-precision sub-scanning.

When printing is completed down to the end of the normal printing area, the CPU 41 processes the printing of the lower-end processing area shown in FIG. 8 (step S40). In this embodiment, the transition to the lower-end processing area follows the completion of printing of the preset prescribed number of raster lines in the normal printing area. As in the case of the normal printing area, the lower-end printing procedure comprises continually repeating a process comprising setting the main scanning pass data, executing main scanning pass, setting the sub-scanning, and executing sub-scanning amount. The sub-scan feed amount used for lower-end printing may be different from the feed amount used for the normal printing area. As described below, the sub-scan feed amount for lower-end printing is preset and stored in memory.

Figure 11:
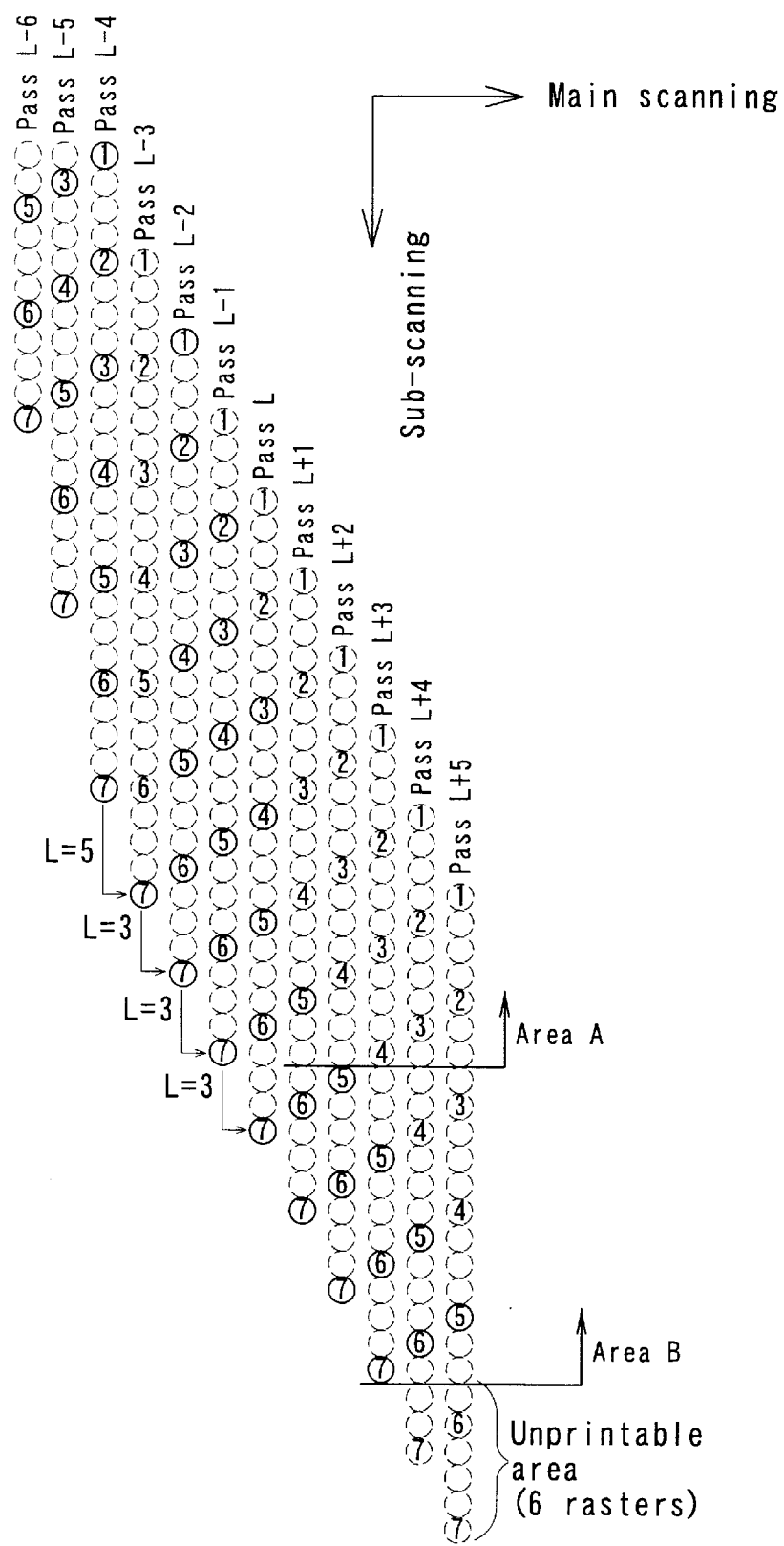
FIG. 11 is a diagram for explaining how printing is handled in the lower-end processing area.

FIG. 11 shows how printing is accomplished in the lower-end processing area. In this example too, the head has seven nozzles set at a four-dot pitch. FIG. 11 shows the position of the head in the sub-scanning direction in 12 main scanning passes, shown as passes L−6 to L+5. The position of the head in L−6 and L−5 corresponds to the head position in FIG. 19. In the following, the significance of the lower-end processing of the invention will be explained, using FIG. 19 for comparison.

Figure 19:
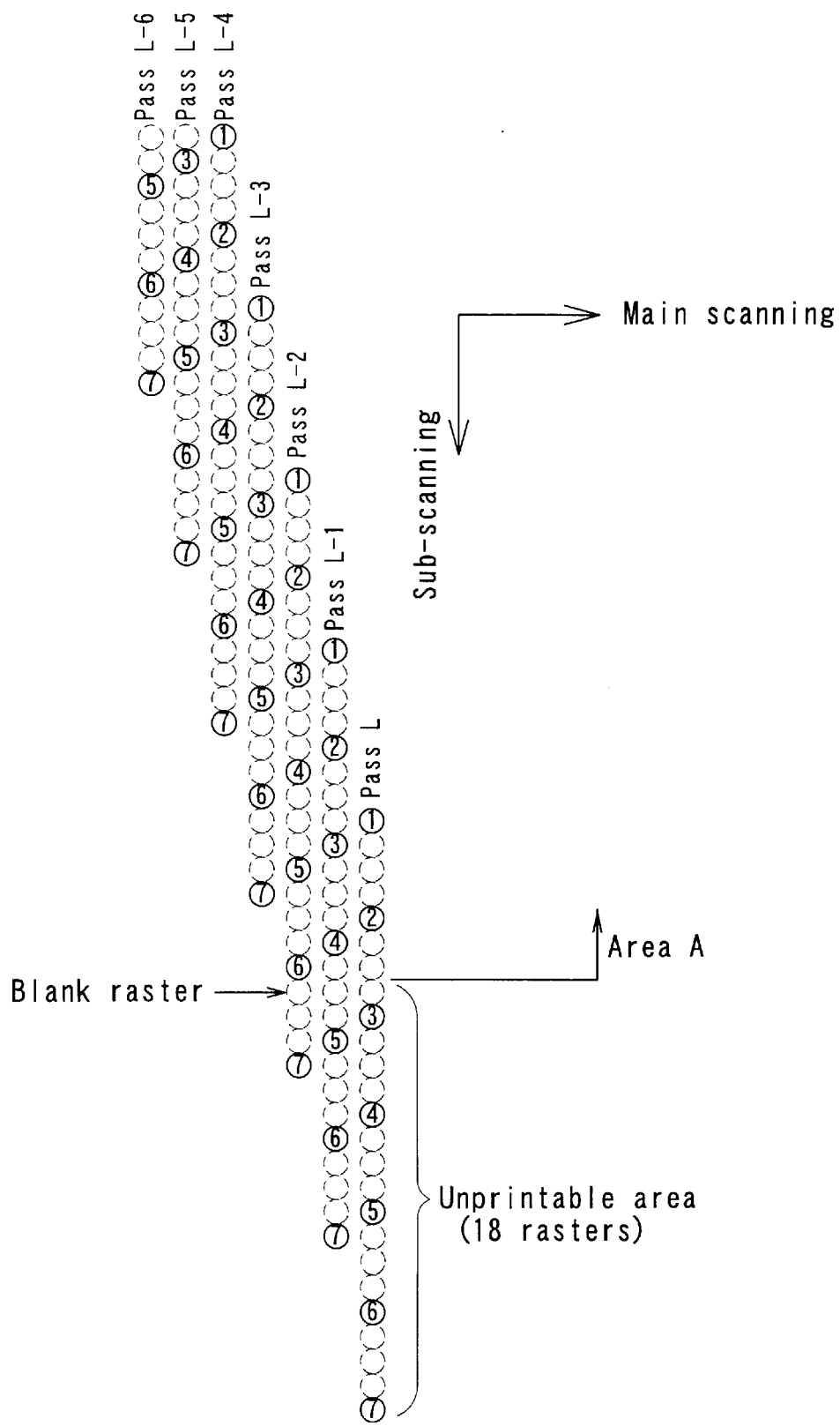
FIG. 19 is a diagram for explaining interlaced printing in the vicinity of the lower end.

With reference to FIG. 11, up until main scanning pass L−4, the head is advanced seven raster lines at a time in the sub-scanning direction. Upon completion of main scanning pass L−4, for lower-end processing the amount of the sub-scanning advance is reduced to five raster lines, and then to three raster lines for each subsequent pass. In main scanning passes from L−3 onwards nozzles scan raster lines that are already formed. Those nozzles are masked, so that dots are formed by nozzles only on the raster lines where dot formation have not yet been completed. These sub-scanning advances are all high-precision feeds. In the case of FIG. 19, the head continues to be advanced at a 7-raster line pitch, so that in main scanning pass L the head has reached a position beyond which it cannot be advanced at high precision. In contrast, in the lower-end processing shown in FIG. 11, because the sub-scanning advancement of the head is implemented in smaller amounts, more main scanning unit passes can be implemented within the range of high-precision sub-scan advancement, up to L+5 in the example shown in FIG. 11.

Moreover, implementing sub-scanning in smaller amounts makes it possible to print an image within area B without any blank raster lines as shown in FIG. 11. In FIG. 11, the extent of area B is shown in conjunction with that of area A, which is the area that can be printed using a fixed sub-scan feed amount, corresponding to the area A shown in FIG. 19. As can be seen by comparing the two drawings, using lower-end processing makes it possible to expand the area in which printing can be effected using high-precision head advancement. In the example of FIG. 11, the unprintable area has been reduced to six raster lines, compared to 18 raster lines in the case of a fixed-advance system.

In the case of this embodiment, lower-end processing is implemented to maximize the size of the area that can be printed at high precision in the standard printing mode. Although the above example is described with reference to a head having seven nozzles set at a four-dot pitch, the same type of processing can be implemented by selecting a feed amount within a range that is smaller than that used in the normal printing area and is appropriate for the dot pitch and number of nozzles concerned.

When in step S20 (FIG. 7) it is determined that expanded mode has been selected, expanded mode printing is carried out. Specifically, the CPU 41 effects interlaced printing of the high-precision area of FIG. 9 (step S50). In this embodiment, printing of the high-precision area is effected by the same method used to perform normal printing in standard mode, which is illustrated by FIG. 10. This means that if the head used has seven nozzles set at a four-dot pitch, in sub-scanning the head is advanced at a fixed feed of seven raster lines.

When the printing has been completed down to the lower edge of the high-precision area, the CPU 41 implements low-precision interlaced printing (step S60). In this embodiment, the transition to low-precision sub-scanning takes place when the head passes the limit point of high-precision sub-scanning. As described below, however, it is not essential to determine whether high-precision sub-scanning has ended. Also, unlike in standard printing mode, there is no lower-end processing.

Figure 12:
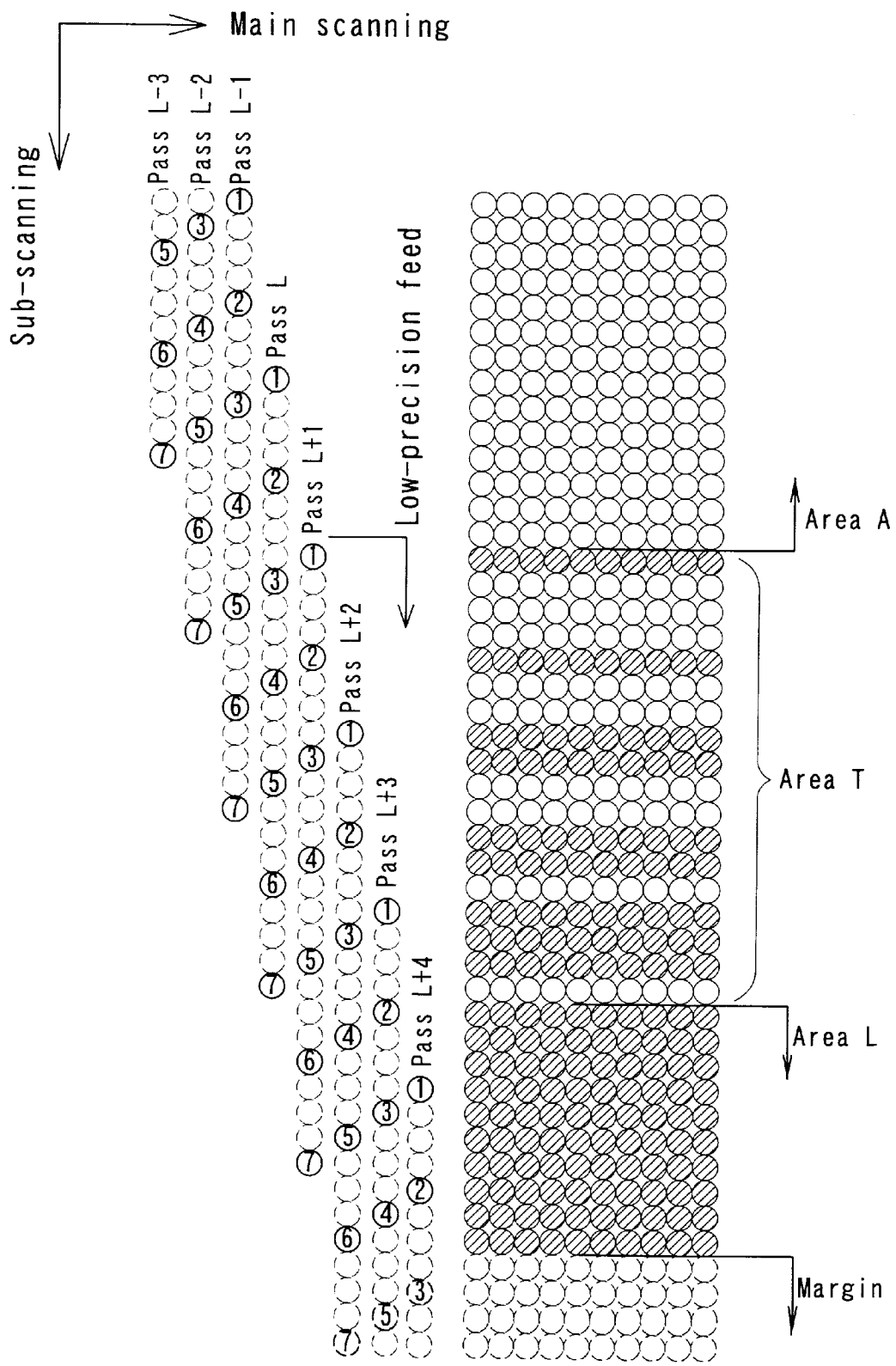
FIG. 12 is a diagram for explaining printing in the vicinity of the lower end, using the expanded printing mode.

FIG. 12 is a diagram for explaining printing in the vicinity of the lower end, in expanded printing mode, using ahead with seven nozzles set at a four-dot pitch. In the expanded printing mode, the high-precision area is printed with no lower-end processing, so the dot printing at the bottom of the high-precision area is comparable to that of FIG. 19. In the following, low-precision printing is explained using FIG. 19 for comparison.

FIG. 12 shows details of main scanning passes L−3 to L+4. Main scanning pass L is the limit with respect to high-precision advancement of the head. In area A of FIG. 12, an image can be printed without giving rise to any blank raster lines. This area corresponds to the high-precision area in FIG. 9 and area A in FIG. 19. With the printing method used with respect to FIG. 19, because blank raster lines form below area A, nozzle 7 is not used to form dots in main scanning pass L−2, neither are nozzles 5 to 7 in main scanning unit pass L−1 and nozzles 3 to 7 in main scanning unit pass L. In the expanded printing mode, however, even these nozzles are used to form raster lines. That is, at the point at which main scanning unit up to pass L is finished, the image in area A has been completed and raster lines depicted in FIG. 19 by the white circles are intermittently formed.

In the expanded printing mode, when the high-precision printing is finished, low-precision printing is effected using the same sub-scan feed amount. With reference to the example of FIG. 12, sub-scanning proceeds at a fixed feed of seven dots. In FIG. 12, the low-precision printing is effected by main scanning passes L+1 to L+4. In this embodiment the same feed amount is used for both low-precision printing and high-precision printing, so type of printing can be implemented without having to identify whether the high-precision printing has been completed or not.

In FIG. 12, hatched circles denote dots printed at low precision. Because the feed amount used is the same as that used for high-precision printing, interlaced printing can be used. As described, in main scanning up to main scanning pass L, raster lines were intermittently formed below area A using high-precision sub-scan feed. In the expanded printing mode, these can be supplemented by raster lines formed therebetween using low-precision feed. As shown in FIG. 12, in a region that extends to the position of nozzle 7 in the main scanning unit pass L, this gives rise to an area T in which there exists a mixture of high-precision and low-precision raster lines corresponding to the mixed-raster line area in FIG. 9. Printing in an area L below the mixed-raster line area is effected only with raster lines formed using a low-precision feed. This area corresponds to the low-precision area in FIG. 9.

Since low-precision sub-scanning can be effected anywhere at the lower end of the paper P, images can be printed there without blank raster lines. However, near the lower end, part of the head is over the margin. In FIG. 12, this is the part covered by nozzle 7 in pass L+2, nozzles 5 to 7 in pass L+3 and nozzles 3 to 7 in pass L+4. These nozzles that overhang the margin are not supplied with printing data by the CPU 41, but with masking data that signifies non-formation of dots. Under the control of the CPU 41, the printing continues to be implemented using the low-precision feed until the image is completed.

Thus, in accordance with the embodiment of the printer described in the foregoing, in the expanded printing mode the size of the printable area can be increased by utilizing low-precision sub-scanning. A small margin is left to ensure that ink droplets do not miss the end of the paper and get onto the platen as a result of error in the sub-scanning feed.

As shown in FIGS. 9 and 12, in the expanded mode the printer prints a mixed-raster line area between the high-precision and low-precision areas. The presence of the mixed-raster line area makes the transition between high-precision and low-precision areas less noticeable in terms of image quality, and also makes it possible to suppress pseudo-outlines at boundaries between areas of different print quality. Thus, the printable area can be expanded without loss of image quality.

The fact that the printer uses the same sub-scan feed amounts for both high-precision and low-precision printing simplifies the control processing required to accomplish the expanded printing.

The ability of the printer to print in either of the two modes enables a user to choose the mode best suited to the printing requirements concerned. As shown in FIG. 11, the lower-end processing used in the standard printing mode allows high-precision printing to be extended down past the lower end of area A, while, as shown in FIG. 12, with the expanded printing mode high-precision printing is realized within the range of the area A. Therefore, in printing an image within an area extended by lower-end processing, higher quality printing can be achieved by using the standard printing mode. Images that exceed the area thus extended can be printed using the expanded printing mode. The provision of the two modes makes the printer more flexible and convenient.

A configuration can be used that enables the appropriate mode to be selected by the printer driver rather than by the user as described above. Thus, the system could be configured to automatically select the expanded printing mode if an image to be printed exceeds an area extended by lower-end processing. Alternatively, the mode used could be selected based on whether text or graphic data is to be printed, the type and thickness of the paper, an overlapping method, the resolution and other such printing conditions. The overlapping method means a type of printing in which each raster line is printed using plural nozzles.

The above description relates to a configuration in which, in the expanded printing mode, the same feed amount is used for both high-precision and low-precision sub-scanning. However, a different feed amount may be used.

Figure 13:
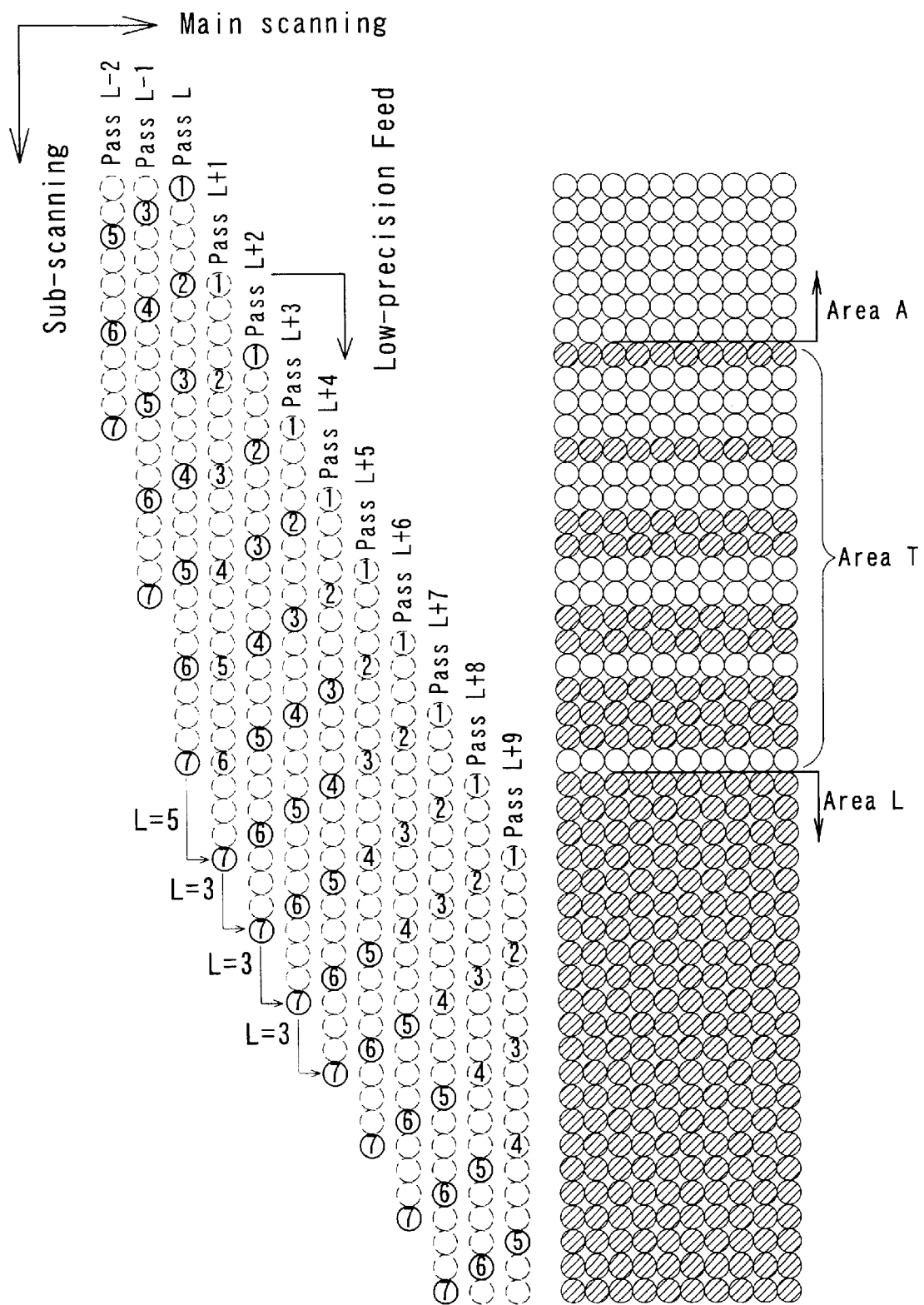
FIG. 13 is a diagram for explaining expanded mode printing according to a first variation.

FIG. 13 is a diagram for explaining a first variation of the expanded mode printing system. The head used in this example has seven nozzles set at a four-dot pitch. As in the foregoing embodiment, in the area up to main scanning unit pass L, the sub-scanning feed amount is fixed at seven dots, and blank raster lines are intermittently formed below the high-precision area A, shown as lines of white circles.

In this first variation, after completion of pass L, sub-scanning is effected by advancing the head by a five-dot amount, which is followed by main scanning unit pass L+1. After L+2 and each subsequent pass, the head is advanced three dots. Thus printing of the lower-end processing area is implemented using the same type of sub-scan advancement described with reference to FIG. 11. Nozzles that scan raster lines that are already formed are masked.

As shown by FIG. 13, when the printing is implemented using a low-precision sub-scan feed, a low-precision area L can be formed below the high-precision area A, with the two areas being separated by a mixed-raster line area T. Thus, the printable area can be expanded without loss of image quality. Because the sub-scanning feed amount changes at the end of the high-precision feed area, the printing history has to be used to determine whether low-precision feed should be implemented. In accordance with this first variation, low-precision sub-scanning is implemented using sub-scan feed amounts that are smaller than those used in a high-precision area. Reducing the sub-scanning feed amount also decreases the feed error. Thus, an advantage of the first variation is that, by making it possible to compensate for the decrease in feed precision, it enables the image quality to be improved, especially in the low-precision areas. Various low-precision sub-scanning amounts can be set according to the pitch and number of the nozzles used.

The implementation of the first variation corresponds to the use of lower-end processing in a low-precision area, and has the advantage of making it possible to reduce the likelihood of contact between print head and paper. When lower-end processing is implemented in a low-precision area, in the case of FIG. 13, for example, at the point at which printing of area L is completed, which is main scanning unit pass L+9, nozzles 6 and 7 are out past the trailing edge of the paper. When lower-end processing is not implemented in a low-precision area, as shown in FIG. 12, at the completion of area L, nozzles 4 to 7 are out past the end of the paper. At the low-precision area, the trailing edge of the paper has been released by the feed rollers and can touch the head if it curls. Such contact can soil the paper and damage the head. By reducing the extent to which the head projects beyond the end of the paper, lower-end processing in the low-precision area makes it less likely that such contact between head and paper will happen.

Figure 14:
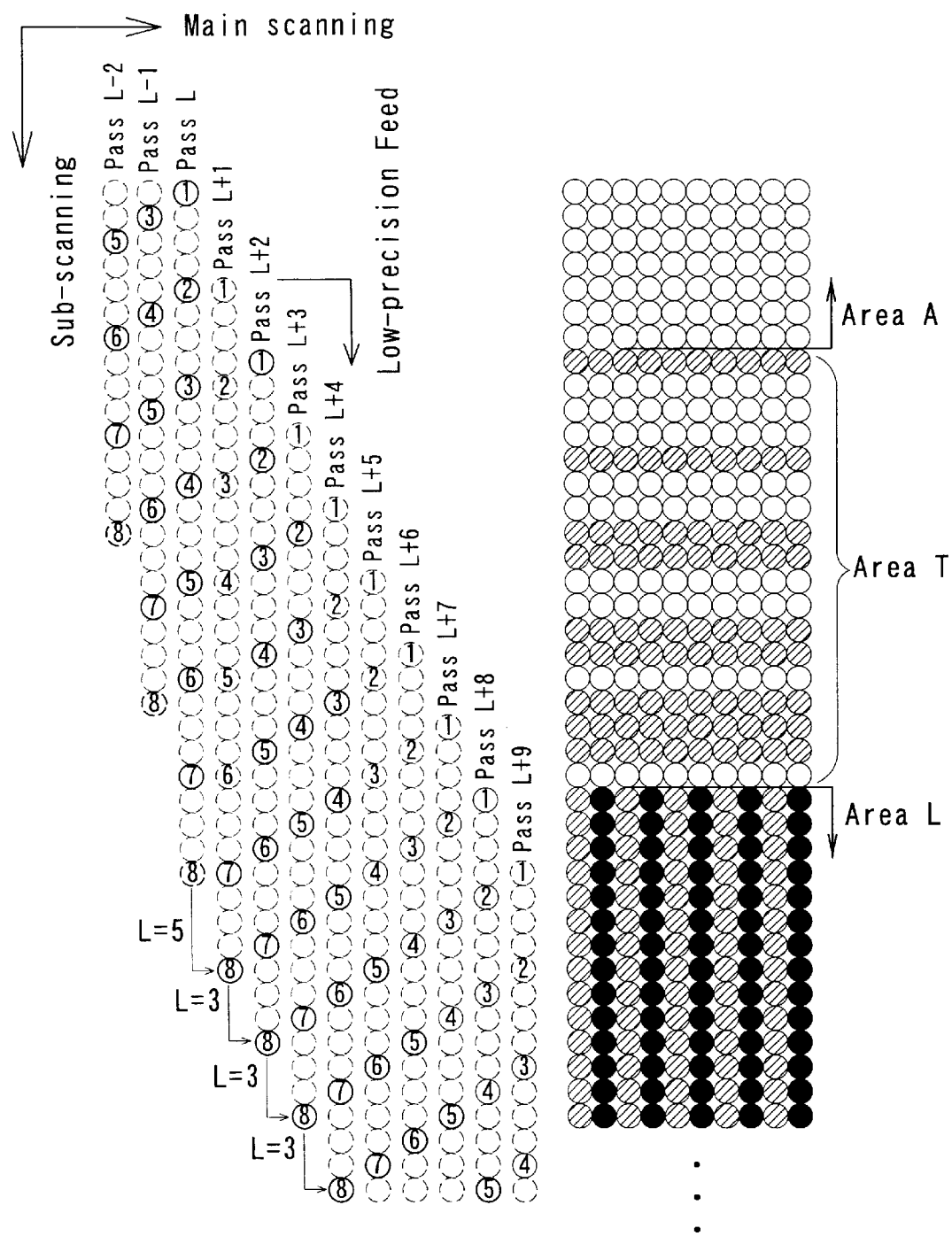
FIG. 14 is a diagram for explaining expanded mode printing according to a second variation.

FIG. 14 is a diagram for explaining expanded mode printing according to a second variation. The head used in this example has eight nozzles set at a four-dot pitch. As in the foregoing embodiment, in the area up to main scanning unit pass L, the sub-scanning is implemented at a fixed feed amount of seven dots. Up to pass L, printing in the high-precision area A is accomplished using nozzles 1 to 7. As in the above embodiment, blank raster lines are intermittently formed below the high-precision area A. In FIG. 14, the lines of white circles denote raster lines formed using a high-precision feed.

In this second variation, after completion of pass L, sub-scanning is effected by advancing the head five dots, which is followed by main scanning unit pass L+1. After L+2 and each subsequent pass, the head is advanced three dots. This is the same as the first variation. However, the second variation uses a different method for printing the dots in the direction of the main scanning unit. As shown in FIG. 14, although in the case of the mixed-raster line area T the raster lines are formed in the same was as in the first variation, two main scanning unit passes are used to form each of the raster lines of the low-precision area L. In other words, the raster lines are formed by the overlap method.

By effecting sub-scanning using the feed amount shown in FIG. 14, each of the raster lines of the low-precision area L is scanned by two nozzles. The first pass is used to form the dots of the odd-numbered pixels, which are the hatched elements in area L. The second pass is used to form the dots of the even-numbered pixels. When low-precision feed is being used, nozzle 8 is also used for dot formation.

The second variation can also be used to form the low-precision area L below the high-precision area A, with the mixed-raster line area T between areas L and A, thereby also making it possible to expand the printable area without a loss of quality. This second variation also uses the overlap system for printing within the low-precision area. Overlapping enables the image quality to be improved by diffusing the effect of positional deviations in dot formation. Thus, an advantage of the second variation is that, by making it possible to compensate for the decrease in feed precision, it enables the image quality to be improved, especially in the low-precision areas. Various low-precision sub-scanning setting scan be used, depending on the pitch and number of the nozzles used.

Figure 15:
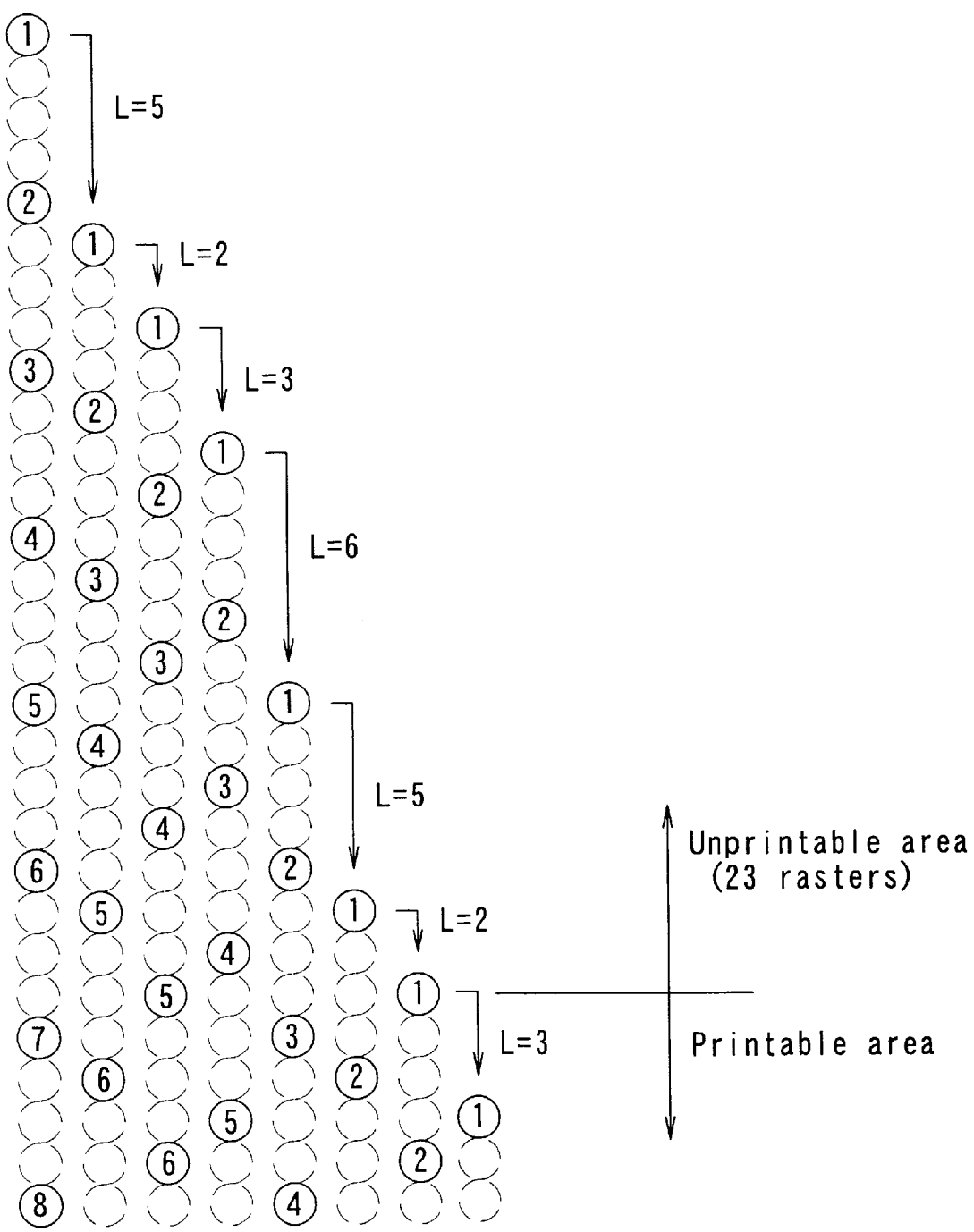
FIG. 15 is a diagram for explaining expanded mode printing according to a third variation.

In each of the embodiments described above, in the high-precision area sub-scanning is implemented by advancing the head a fixed distance, and each raster line is formed in a single main scanning unit pass. However, the invention is not limited to implementing sub-scanning by moving the head a fixed distance, and raster lines may be formed in two or more main scanning unit passes. FIG. 15 is a diagram for explaining expanded mode printing according to a third variation, using a head having eight nozzles set at a four-dot pitch.

FIG. 15 shows the initiation of printing at the upper end of the paper. An image is printed on the printable area by repeating a cycle of sub-scan feed amounts comprising five dots, two dots, three dots and six dots. Moreover, two nozzles are used for each raster line scan, enabling printing by the overlap system. The same feed amounts are used for printing the low-precision area, enabling expanded printing similar to that in the foregoing embodiment. In the low-precision area, expanded printing such as that of the first variation is accomplished by effecting sub-scanning at an average feed amount that is smaller than the four-dot average feed amount used in the high-precision area. Also, expanded printing such as that in the second variation is accomplished in the low-precision area by using three or more main scanning unit passes to form each raster line, compared to the two passes used to form raster lines in the high-precision area.

Figure 16:
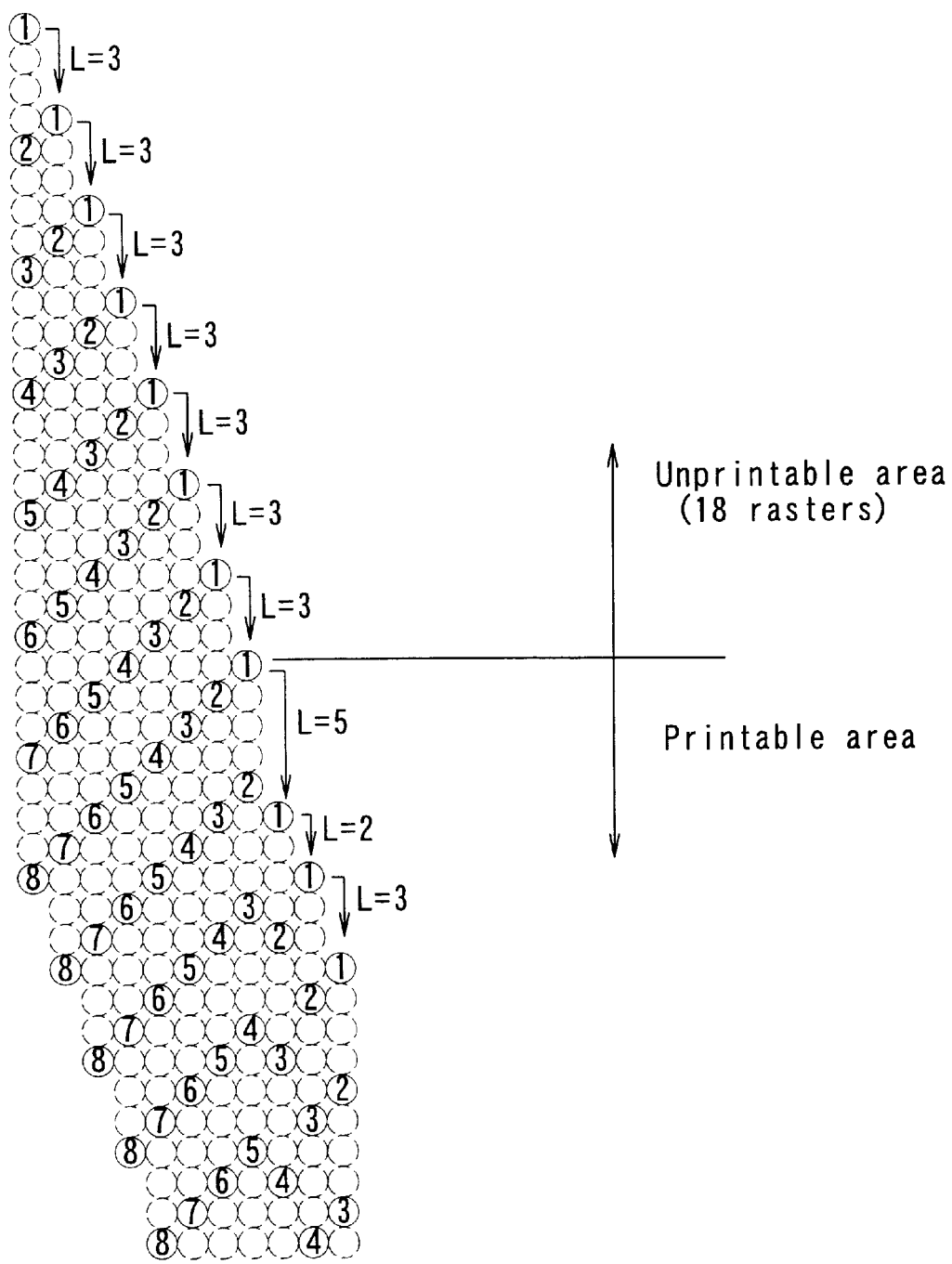
FIG. 16 is a diagram for explaining printing using upper-end processing.

In each of the above embodiments, the sub-scan feed amount used at the initiation of the printing at the upper end differs from the normal feed amount. FIG. 16 is a diagram for explaining printing is handled using upper-end processing. As in the example of FIG. 15, the head used has eight nozzles set at a four-dot pitch. As shown, upper-end processing comprises implementing seven repetitions of a three-dot sub-scan, which is followed by repeating the same sub-scan feed cycle of f five dots, two dots, three dots and six dots used in the example of FIG. 15. Doing this allows an image to be printed in the printable area shown in FIG. 15, using two nozzles to form each raster line. This results in an unprintable area of 18 raster lines at the upper end. When a sub-scanning feed cycle is used to initiate the printing, the result is an unprintable area of 23 raster lines, as shown in FIG. 15. Upper-end processing enables the printable area to be extended upwards. Even when upper-end processing is used, the execution of the sub-scanning mainly in the high-precision area is the same as that of FIG. 15, so each can be used to achieve expanded printing.

Figure 17:
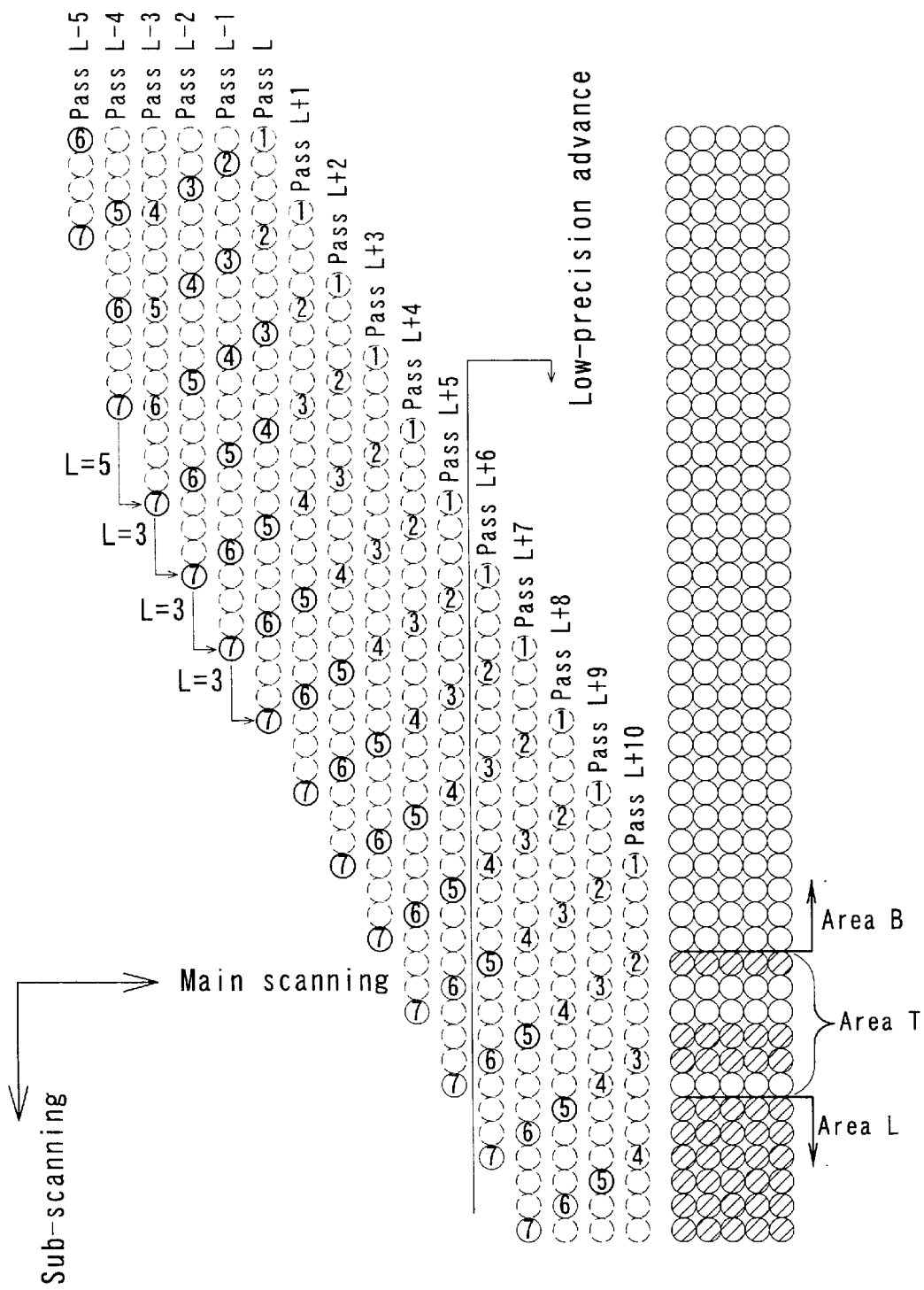
FIG. 17 is a diagram for explaining expanded mode printing according to a fourth variation.
Figure 18:
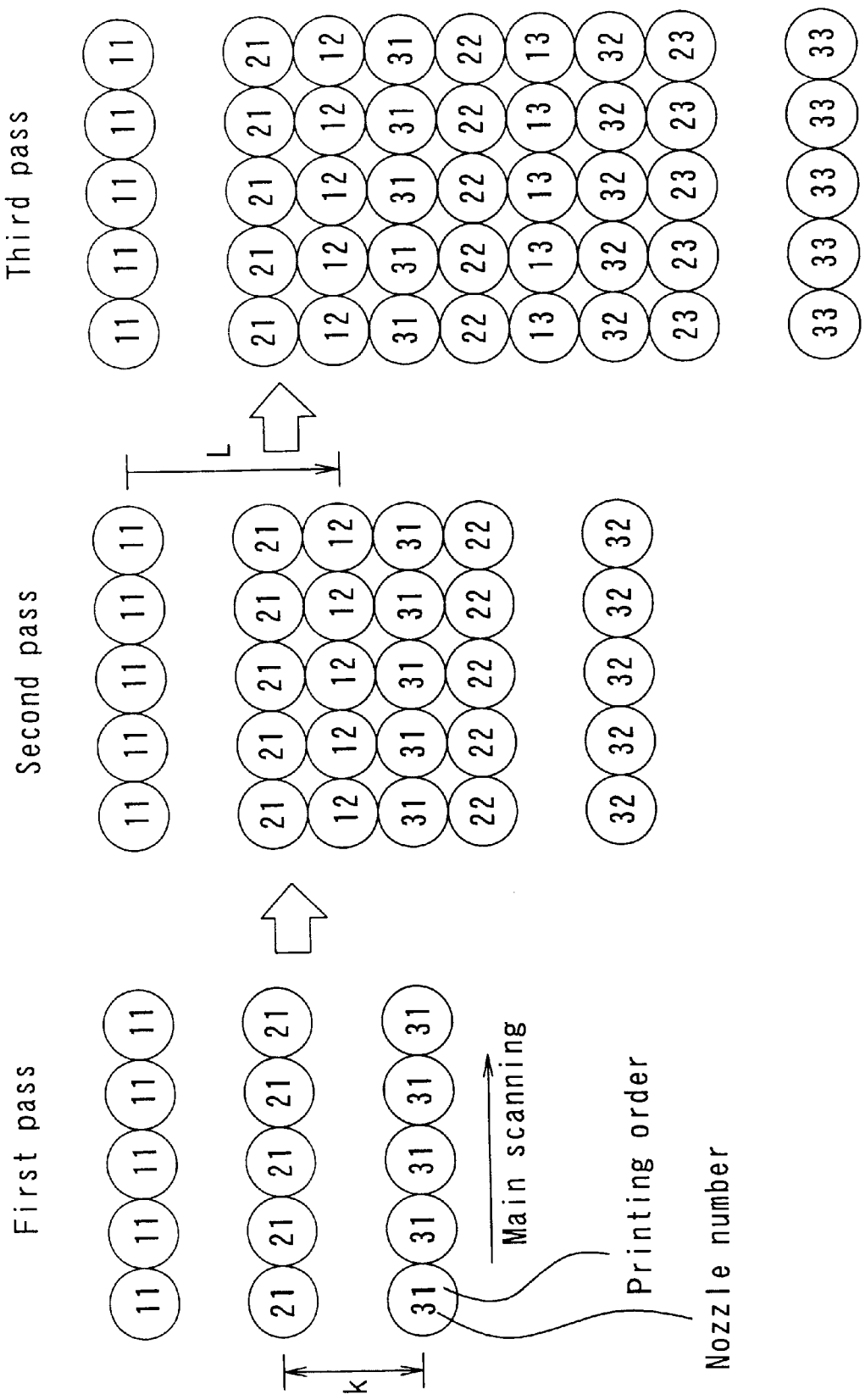
FIG. 18 is a diagram for explaining interlaced printing.

In a fourth variation, printing of the low-precision area can be performed while the lower-end processing shown in FIG. 11 is being effected in the high-precision area. FIG. 17 is a diagram for explaining expanded mode printing in the case of this fourth variation. The head used in this example has seven nozzles set at a four-dot pitch. As shown, lower-end processing is performed in the high-precision area, as in FIG. 11. However, in the case of FIG. 11, the nozzles that in main scanning unit passes L+4 and L+5 extend beyond the lower end of the printable area B are masked, while in this fourth variation these nozzles are used to form raster lines.

After lower-end processing is finished, raster lines are formed from pass L+6 onwards, using the same low-precision feed. The feed amount used at this time corresponds to the three-dot feed used in the lower-end processing. This feed amount continues to be used until the completion of the printing.

This fourth variation also forms the high-precision area XB, mixed-raster line area T and low-precision area L adjacently, as shown in FIG. 17. Therefore, the printable area can be expanded without any excessive degradation of image quality. Also, since the fourth variation effects lower-end processing using a high-precision feed, the high-precision area B can be expanded, too. Moreover, the small feed used for sub-scanning in the low-precision area makes it possible to compensate for the decrease in sub-scanning precision. This unit that the fourth variation is able to provide high-quality printing.

The above embodiments have described with reference to a head having seven or eight nozzles set at a four-dot pitch. However, the invention is not limited thereto, and can be realized using heads with various numbers of nozzles and nozzle pitches. Similarly, the printer is not limited to one that uses main scanning unit to form raster lines. Likewise, the printer is not limited to the use of piezoelectric elements to emit the ink used to form dots,.but can include other mechanisms for that purpose, such as a heater that produces bubbles in the ink, causing the ink to be emitted. Also, the mechanism used to form the dots is not limited to the emission of ink.

Although the embodiments have been described with reference to the use of rollers to supply, transport and eject the paper, the invention is not limited thereto and can use various other unit to achieve the same aim. Again, while in the embodiments the feed rollers for effecting high-precision transport of the paper are located on the upstream side with respect to the sub-scanning, and the low-precision ejection rollers on the downstream side, a reverse arrangement is also possible. In such a case, the printed image in the case of FIG. 9 would be the other way around, with the low-precision area at the top, followed by the mixed-raster line area and the high-precision area.

While the printer PRT has been described as setting the sub-scanning feed amount, the system can instead be configured so that a printer driver in the computer PC sets the feed amount for each main scan and supplies the printer PRT with the setting together with the printing data.

The present invention is in no way limited to the details of the examples and embodiments described in the foregoing, but may be changed and modified without departing from the scope of the appended claims. Thus, the number of ink colors used is not limited to the six described herein.

What is claimed is:

1. A printer that prints an image on a print medium by using a print head to form raster lines in a main scanning direction and scan in a sub-scanning direction at right-angles to the main scanning direction, said printer comprising:

said print head having a plurality of dot formation elements disposed in said sub-scanning direction at a prescribed spacing that is at least two dot pitches, and said dot formation elements being divided into plural element groups each forming dots of different ink, said element groups being disposed separately in the main scanning direction;

a first transport mechanism that effects a first type of sub-scanning by transporting at a first precision at least one selected from the print head and the print medium;

a second transport mechanism that, even when sub-scanning cannot be effected by the first transport unit, effects a second type of sub-scanning by transporting at a second precision that is lower than the first precision at least one selected from the print head and the print medium;

a data supply unit that assigns to the dot formation elements raster data representing raster lines constituting the image, supplies the raster data to the print head;

a raster line formation unit that drives the print head to form each raster line in accordance with the raster data supplied by the data supply unit; and a first sub-scanning controller that performs sub-scanning by preset feed amounts with the first and second transport mechanism such that an area is formed in which raster lines formed during the second type of sub-scanning are interposed between raster lines formed during the first type of sub-scanning.

2. A printer according to claim 1, wherein a feed amount during the second type of sub-scanning is the same as a feed amount during the first type of sub-scanning.

3. A printer according to claim 1, wherein a feed amount during the second type of sub-scanning is smaller than an average feed amount during the first type of sub-scanning.

4. A printer according to claim 1, wherein a feed amount during the second type of sub-scanning is set at an amount that enables formation of raster lines by a larger number of elements than a number of elements required to form raster lines during sub-scanning by the first transport unit.

5. A printer according to claim 1, said printer further comprising:

a second sub-scanning controller that uses just the first transport unit to effect sub-scanning; and a selector that, based on specific conditions, selects one of said first and second sub-scanning controller.

6. A printer according to claim 5, wherein in the printer has a first print mode that uses the first sub-scanning controller and a second print mode that uses the second sub-scanning controller, and the selector selects one of the first and second controller according to selection of the print mode by a user.

7. A printer according to claim 5, wherein the selection unit selects the sub-scanning unit when the image to be printed is larger than a prescribed size.

8. A printer according to claim 5, wherein at least in an area located at one end in a sub-scanning direction, the second sub-scanning unit performs sub-scanning at a smaller average feed amount than an average feed amount used for sub-scanning in a central area.

9. A printer according to claim 1, wherein the formation elements are elements that form dots by emitting ink, and the first transport unit is located upstream of the formation elements in terms of sub-scanning direction.

10. A printer according to claim 9, wherein the first transport unit is provided with upstream rollers that use a prescribed frictional force to transport the print medium on the upstream side, and the second transport unit is provided with downstream rollers to transport the print medium on the downstream side, using a frictional force that is less the frictional force of the upstream rollers.

11. A method of printing images on a print medium by using a print head to form raster lines separated in a sub-scanning direction by a spacing that is not less than two dots, and by performing sub-scanning at right-angles to the raster lines, said method comprising the following steps:
   a) assigning raster data for forming raster lines for printing the image, supplying the data to the print head, and masking formation elements where no raster lines are to be formed,
   b) driving the print head to form each raster line in accordance with the data, and
   c) performing sub-scanning by a preset feed amount when there arises a condition in which, in sequentially effecting first sub-scanning by transporting at a first precision at least one selected from the print head and the print medium and, where the first sub-scanning cannot be accomplished, second sub-scanning by transporting at a second precision that is lower than the first precision at least one selected from the print head and the print medium, an area is formed in which raster lines formed during the second sub-scanning are included between raster lines formed during the first sub-scanning.

12. A recording medium on which is recorded a computer program used to drive a printer to print images on a print medium, said computer program implementing steps comprising:
   controlling main scanning unit of a print head having a plurality of dot formation elements disposed in a sub-scanning direction at a prescribed spacing that is not less than two dots and dot formation elements for forming dots of a different type disposed separately in the sub-scanning direction; and
   sequentially executing sub-scanning at a first precision and at a second precision that is lower than the first precision,
      said sub-scanning using a preset sub-scan feed amount when a condition arises in which, in sequential usage of a first transport unit and a second transport unit, an area is formed in which raster lines formed during sub-scanning effected by the second transport unit are included between raster lines formed during sub-scanning effected by the first transport unit.

13. A recording medium on which is recorded a computer program used to drive a printer to print images on a print medium, said computer program implementing steps comprising:
   controlling a main scanning unit of a print head having a plurality of dot formation elements disposed in a sub-scanning direction at a prescribed spacing that is not less than two dots, and dot formation elements for forming dots of a different type disposed separately in the sub-scanning direction; and
   sequentially executing sub-scanning at a first precision and at a second precision that is lower than the first precision,
      said sub-scanning using a preset sub-scan feed amount regardless of whether sub-scanning is being performed at the first or second precision.

14. The recording medium according to claim 13, on which is recorded a program that, based on prescribed conditions, effects a function that selectively executes a second sub-scanning function for performing sub-scanning at just a first precision, and said sub-scanning function and second sub-scanning function.

* * * * *